United States Patent
Ben Henda et al.

(10) Patent No.: US 11,849,319 B2
(45) Date of Patent: Dec. 19, 2023

(54) METHODS PROVIDING NON-3GPP ACCESS USING ACCESS NETWORK KEYS AND RELATED WIRELESS TERMINALS AND NETWORK NODES

(71) Applicant: Telefonaktiebolaget LM Ericsson (publ), Stockholm (SE)

(72) Inventors: Noamen Ben Henda, Stockholm (SE); Vesa Lehtovirta, Espoo (FI); Mikael Wass, Sätila (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 149 days.

(21) Appl. No.: 16/631,560

(22) PCT Filed: Jul. 28, 2017

(86) PCT No.: PCT/EP2017/069133
§ 371 (c)(1),
(2) Date: Jan. 16, 2020

(87) PCT Pub. No.: WO2019/020193
PCT Pub. Date: Jan. 31, 2019

(65) Prior Publication Data
US 2020/0178076 A1    Jun. 4, 2020

(51) Int. Cl.
*H04W 12/06* (2021.01)
*H04L 9/40* (2022.01)
(Continued)

(52) U.S. Cl.
CPC ............. *H04W 12/06* (2013.01); *H04L 63/12* (2013.01); *H04W 12/0471* (2021.01); *H04W 12/10* (2013.01)

(58) Field of Classification Search
CPC ... H04W 12/00–108; H04L 63/12–126; H04L 9/08–0897
See application file for complete search history.

(56) References Cited

U.S. PATENT DOCUMENTS

| | | | |
|---|---|---|---|
| 2018/0376445 A1* | 12/2018 | Yoon | H04W 60/06 |
| 2019/0253889 A1* | 8/2019 | Wu | H04W 12/0433 |
| 2019/0261178 A1* | 8/2019 | Rajadurai | H04W 12/069 |

OTHER PUBLICATIONS

International Search Report and Written Opinion of the International Searching Authority, PCT/EP2017/069133, dated May 18, 2018, 21 pages.

(Continued)

*Primary Examiner* — Madhuri R Herzog
(74) *Attorney, Agent, or Firm* — Sage Patent Group

(57) ABSTRACT

A method may be provided at a wireless terminal to support communications with a network node of a wireless communication network. An IKE SA may be initiated to establish a NAS connection between the wireless terminal and the network node through a non-3GPP access network and a non-3GPP interworking function network node. After initiating the IKE SA, an IKE authorization request may be transmitted through the non-3GPP access network to the N3IWF network node, with the IKE authorization request including an identifier of the wireless terminal. An access network key may be derived for the NAS connection through the non-3GPP access network at the wireless terminal, with the access network key being derived based on a NAS count for the wireless terminal and an anchor key. An IKE authorization response corresponding to the IKE authorization request may be received.

10 Claims, 19 Drawing Sheets

(51) Int. Cl.
　　　*H04W 12/10*　　　(2021.01)
　　　*H04W 12/0471*　　(2021.01)

(56) References Cited

OTHER PUBLICATIONS

NEC, "pCR to TR 33.899: Update solution #1.8 on key hierarchy for NextGen", 3GPP TSG SA WG3 (Security) Meeting #86, Feb. 6-10, 2017, Sophia Antipolis (France), S3- 170395 (rev of S3-170157), XP51228879A1, 4 Pages.

Nokia et al., "peR for merged UE registration call flow for untrusted non-3GPP Access", 3GPP TSG SA WG3 (Security) Meeting #87, May 15-19, 2017, Ljubljana, Slovenia, S3-171565 (revision of S3-171341), XP51289742A1, 5 Pages.

Qualcomm Incorporated, "NAS security contexts for N1", 3GPP TSG SA WG3 (Security) Meeting #86Sis Mar. 27-31, 2017, Susan, Korea, S3-170841 (revision of S3-17xabc), XP51248592A1, 2 Pages.

Ericsson, "Discussion on security for multiple NAS connections (KI #1.7)", 3GPP TSG SA WG3 (Security) Meeting #87, May 15-19, 2017, Ljubljana, Slovenia, S3-171274 (revision of S3-17xabc), XP51282771A1, 4 pages.

Ericsson, "New solution for the protection of multiple NAS connections (KI #1.7)", 3GPP TSG SA WG3 (Security) Meeting #87 May 15-19, 2017, Ljubljana, Slovenia, S3-171594 (revision of S3-171275), XP51289775A1, 2 Pages.

Eronen, et al., "An Extension for EAP-Only Authentication in IKEv2", RFC-5998, Internet Engineering Task Force (IETF), Sep. 2010, pp. 1-16.

Kaufman, et al., "Internet Key Exchange Protocol Version 2 (IKEv2)", RFC-7296, Internet Engineering Task Force (IETF), Oct. 2014, pp. 1-142.

Krawczyk, et al., "HMAC: Keyed-Hashing for Message Authentication", RFC-2104, Network Working Group, Feb. 1997, 13 Pages.

3GPP TS 23.501 V1.2.0 (Jul. 2017), 3rd Generation Partnership Project; Technical Specification Group Services and System Aspects; System Architecture for the 5G System; Stage 2 (Release 15), pp. 1-166.

3GPP TS 33.401 V15.0.0 (Jun. 2017), 3rd Generation Partnership Project; Technical Specification Group Services and System Aspects; 3GPP System Architecture Evolution (SAE); Security architecture (Release 15), pp. 1-153.

3GPP TS 24.301 V14.4.0 (Jun. 2017), 3rd Generation Partnership Project; Technical Specification Group Core Network and Terminals; Non-Access-Stratum (NAS) protocol for Evolved Packet System (EPS); Stage 3 (Release 14), pp. 1-486.

3GPP TS 33.220 V15.0.0 (Jun. 2017), 3rd Generation Partnership Project; Technical Specification Group Services and System Aspects; Generic Authentication Architecture (GAA); Generic Bootstrapping Architecture (GBA) (Release 15), pp. 1-93.

3GPP TR 33.899 V1.2.0 (Jun. 2017), 3rd Generation Partnership Project; Technical Specification Group Services and System Aspects; Study on the security aspects of the next generation system (Release 14), pp. 1-586.

\* cited by examiner

Figure 1

| 8 | 7 | 6 | 5 | 4 | 3 | 2 | 1 | |
|---|---|---|---|---|---|---|---|---|
| Security Header Type | | | | Protocol Discriminator | | | | octet 1 |
| Message Authentication Code | | | | | | | | octet 2<br><br>octet 5 |
| Sequence Number | | | | | | | | octet 6 |
| NAS Message | | | | | | | | octet 7<br><br>octet n |

Figure 2

Security Header Type (octet 1)

8 7 6 5
0 0 0 0    Plain NAS message, not security protected

Security Protected NAS message:
0 0 0 1    Integrity Protected
0 0 1 0    Integrity Protected and Ciphered
0 0 1 1    Integrity Protected with new EPS security context (Note 1)
0 1 0 0    Integrity Protected and Ciphered with new EPS security context (Note 2)
0 1 0 1    Integrity Protected and Partially Ciphered NAS Message (Note 4)

Non-Standard L3 Message:
1 1 0 0    Security Header For The SERVICE REQUEST Message 1 1 0 1    These values are not used in this version of the protocol.
   to       If received, they shall be interpreted as '1100'. (NOTE 3)
1 1 1 1

All other values are reserved.

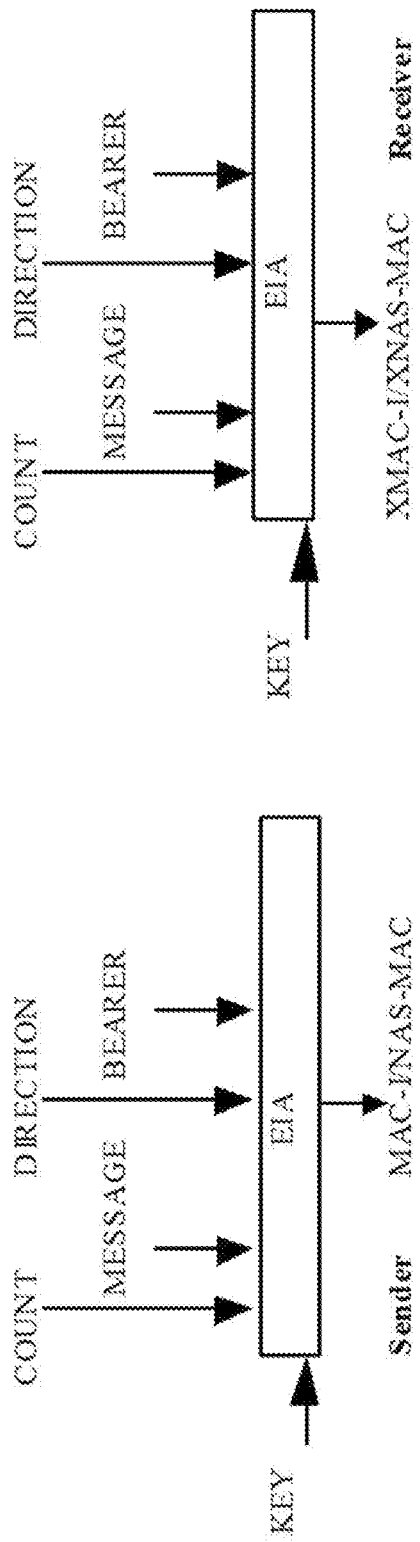

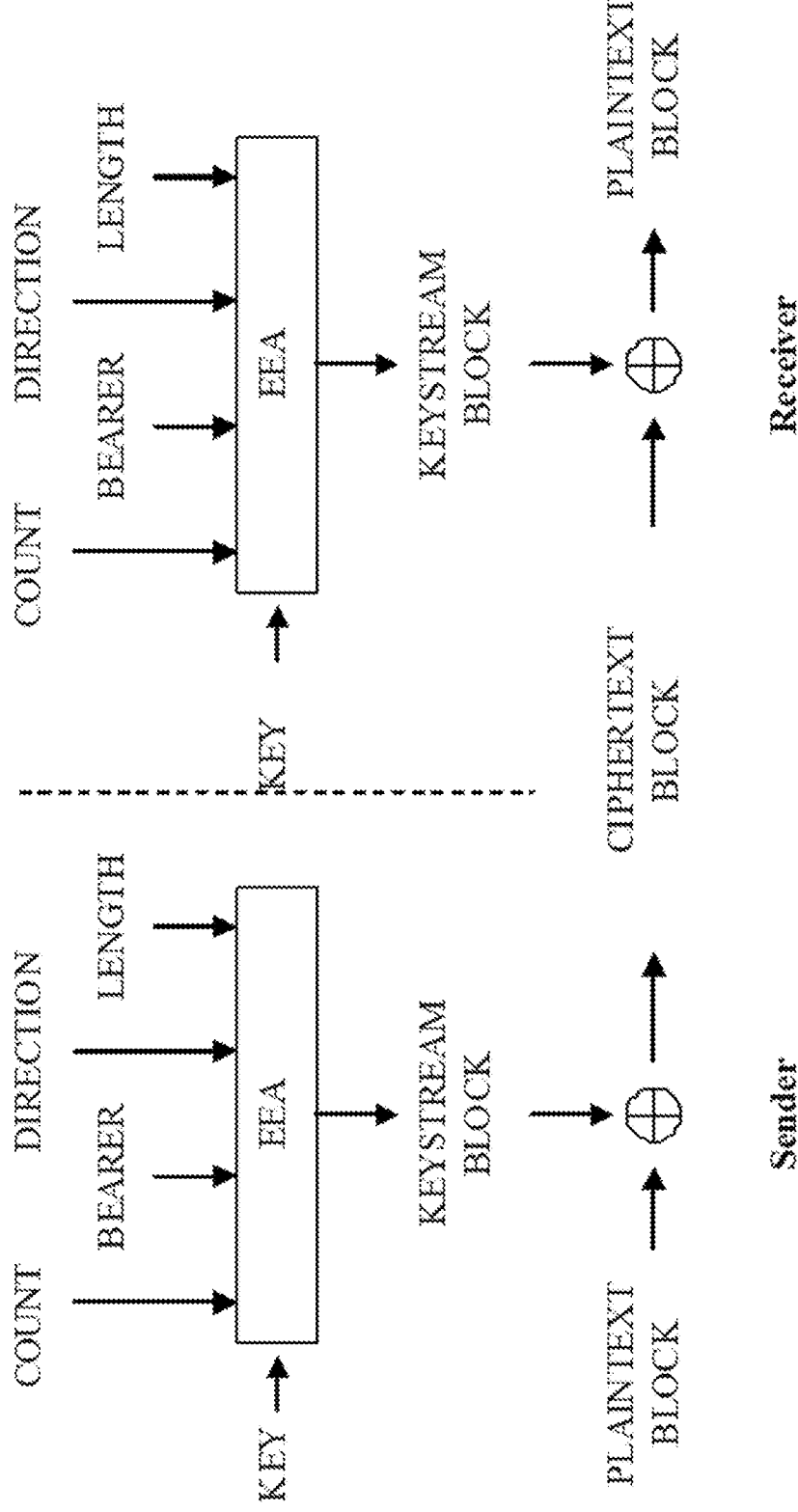

Figure 14
| Process Distinguisher | Value |
|---|---|
| NAS-enc-alg | 0x01 |
| NAS-int-alg | 0x02 |
Figure 15
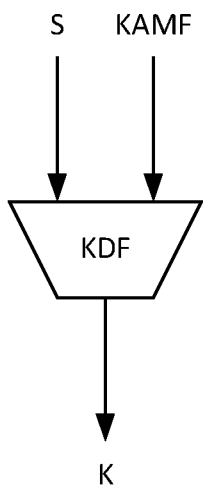
Figure 16
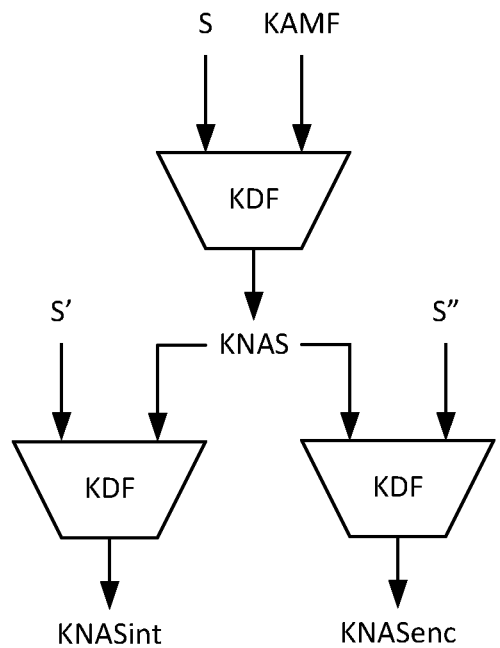

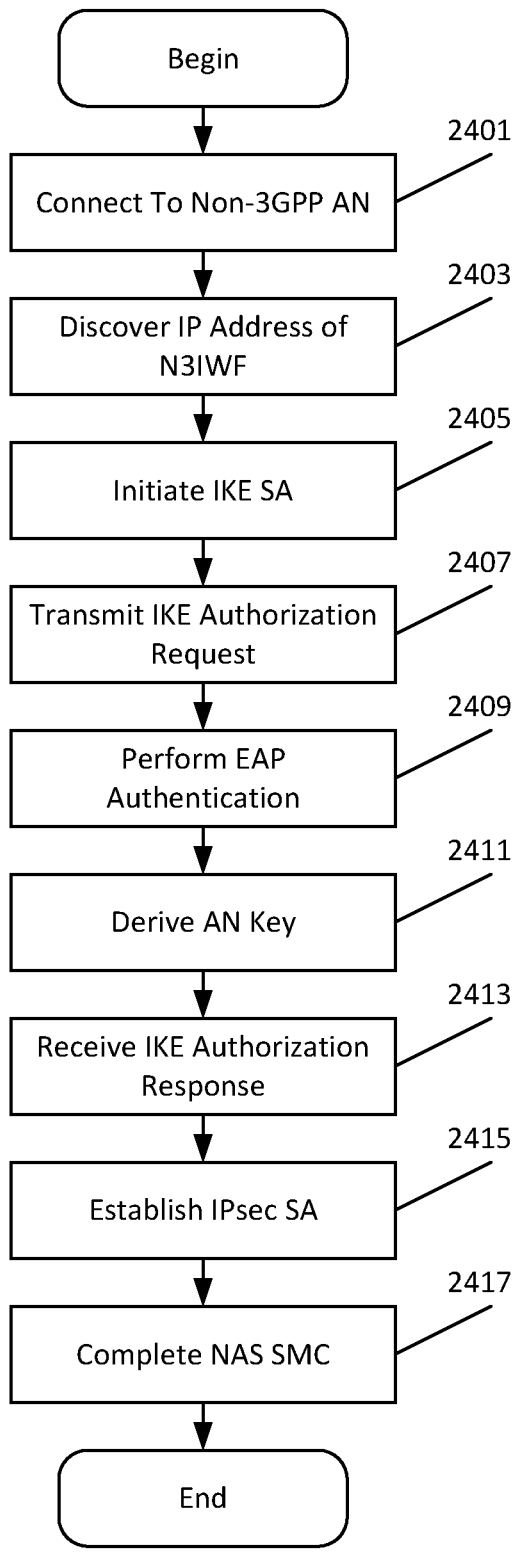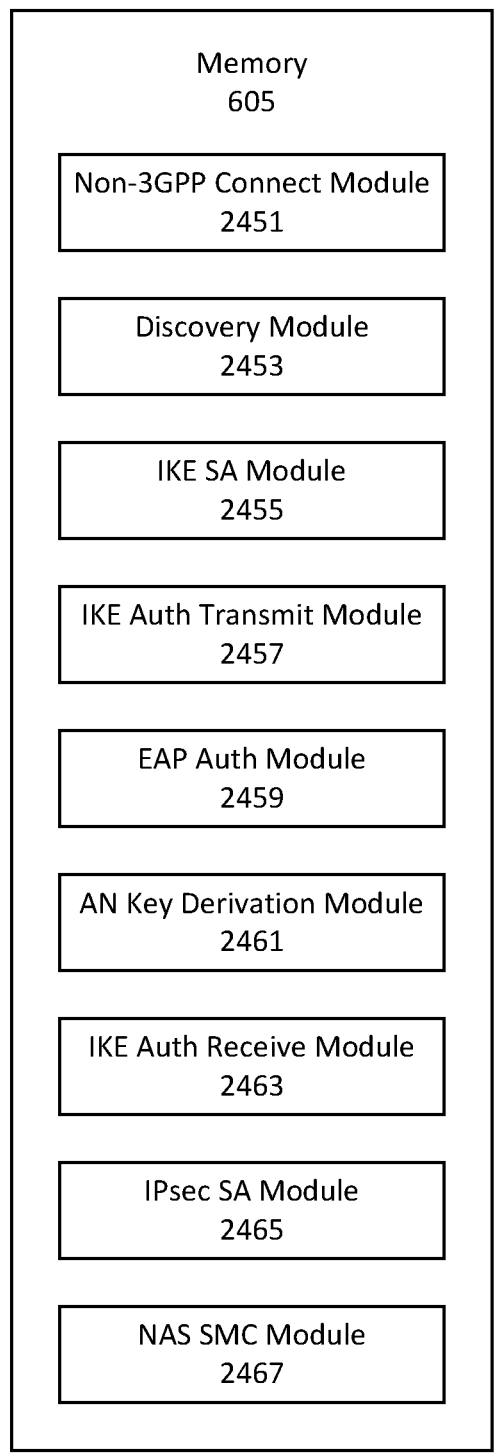

METHODS PROVIDING NON-3GPP ACCESS USING ACCESS NETWORK KEYS AND RELATED WIRELESS TERMINALS AND NETWORK NODES

This application is a 35 U.S.C. § 371 national stage application of PCT International Application No. PCT/EP2017/069133 filed on Jul. 28, 2017, the disclosure and content of which is incorporated by reference herein in its entirety.

TECHNICAL FIELD

The present disclosure relates generally to the field of communications, and more particularly to wireless communications and related network nodes and wireless terminals.

BACKGROUND

In 5G Systems, a wireless terminal UE may be registered simultaneously to the same Public Land Mobile Network PLMN over 3GPP access (for example, using an LTE or 5G access node, also referred to as a base station, eNB, gNB, etc.) and non-3GPP access (for example, using a WiFi or satellite node). For this purpose, it is expected that the wireless terminal UE and the Access Management Function AMF maintain two Non-Access Stratum, NAS, connections, one for each access type. In such scenarios, TS 23.501 (also referred to as reference [1]) further describes which elements of the user context in the AMF would be shared among the NAS connections and which would not. For example, there will be multiple Connection Management (CM) and Registration Management (RM) states, one per access type. On the other hand, a common temporary identifier of the UE may be used.

As described in TS 33.401 (also referred to as reference [2]), security mechanisms in legacy 4G systems may provide integrity, confidentiality, and replay protection for NAS messages. The NAS security context includes the KASME key, the derived protection keys KNASint and KNASenc, the key set identifier eKSI, and a pair of counters NAS COUNTs, one for each direction (uplink UL and downlink DL). These security parameters may be provided for a NAS connection and may be refreshed upon the creation of a new KASME (e.g., following an authentication procedure).

Furthermore, a replay protection mechanism, partly realized by the NAS COUNTs, may rely on assumptions that the protocol is reliable and that NAS procedures are run sequentially such that a new procedure is only started after the termination of the current one. This may provide/guarantee in-order delivery of the NAS messages so that both the UE and the MME need only to store two values for NAS COUNTs, one per direction (i.e., one NAS COUNT for uplink and one NAS COUNT for downlink). These would provide the NAS COUNT value to use in the next NAS message to send, and the NAS COUNT value of the last successfully received NAS message.

With multiple connections via 3GPP and non-3GPP accesses, however, in-order deliver of NAS messages via the different connections may be unreliable, and a continuing demand may exist for improved operations relating to non-3GPP network access.

SUMMARY

According to some embodiments of inventive concepts, a method may be provided at a wireless terminal to support communications with a network node of a wireless communication network. An internet key exchange security association (IKE SA) may be initiated to establish a Non-Access Stratum (NAS) connection between the wireless terminal and the network node through a non-3GPP access network and a non-3GPP interworking function network node. After initiating the IKE SA, an IKE authorization request may be transmitted through the non-3GPP access network to the N3IWF network node, with the IKE authorization request including an identifier of the wireless terminal. An access network key may be derived for the NAS connection through the non-3GPP access network at the wireless terminal, with the access network key being derived based on a NAS count for the wireless terminal and an anchor key. An IKE authorization response corresponding to the IKE authorization request may be received. Moreover, receiving the IKE authorization response may include performing at least one of integrity protection and/or confidentiality protection for the IKE authorization response using the access network key.

According to some other embodiments of inventive concepts, a method may be provided at a network node of a wireless communication network providing communication of Non-Access Stratum (NAS) messages with a wireless terminal. Responsive to receiving a registration request including an identifier of the wireless terminal, an access network key may be derived for a NAS connection between the network node and the wireless terminal through a non-3GPP interworking function network node and a non-3GPP access network. The access network key may be derived based on a NAS count associated with the wireless terminal. A registration response may be transmitted to the N3IWF network node, with the registration response including the access network key for the NAS connection through the N3IWF network node and the non-3GPP access network. After transmitting the registration response, a security mode command procedure may be performed for the NAS connection through the N3IWF network node and the non-3GPP access network.

According to still other embodiments of inventive concepts, a wireless terminal may support communication with a network node of a wireless communication network. The wireless terminal may include a transceiver configured to provide wireless communication over a radio interface, and a processor coupled to the transceiver. The processor may be configured to initiate an internet key exchange security association to establish a Non-Access Stratum (NAS) connection between the wireless terminal and the network node through a non-3GPP access network and a non-3GPP interworking function network node. The processor may be configured to transmit an IKE authorization request through the non-3GPP access network to the N3IWF network node after initiating the IKE SA, with the IKE authorization request including an identifier of the wireless terminal. In addition, the processor may be configured to derive an access network key for the NAS connection through the non-3GPP access network at the wireless terminal, with the access network key being derived based on a NAS count for the wireless terminal and an anchor key. The processor may be configured to receive an IKE authorization response corresponding to the IKE authorization request. Moreover, receiving the IKE authorization response may include performing at least one of integrity protection and/or confidentiality protection for the IKE authorization response using the access network key.

According to yet other embodiments of inventive concepts, a wireless terminal may support communication with a network node of a wireless communication network. The wireless terminal may be adapted to initiate an internet key exchange, IKE, security association, SA, to establish a Network Access Stratum, NAS, connection between the wireless terminal (UE) and the network node (AMF) through a non-3GPP access network and a non-3GPP interworking function, N3IWF, network node. The wireless terminal may be adapted to transmit an IKE authorization request through the non-3GPP access network to the N3IWF network node after initiating the IKE SA, with the IKE authorization request including an identifier of the wireless terminal. The wireless terminal may be adapted to derive an access network key for the NAS connection through the non-3GPP access network at the wireless terminal, with the access network key being derived based on a NAS count for the wireless terminal and an anchor key. The wireless terminal may be adapted to receive an IKE authorization response corresponding to the IKE authorization request. Moreover, receiving the IKE authorization response may include performing at least one of integrity protection and/or confidentiality protection for the IKE authorization response using the access network key.

According to further embodiments of inventive concepts, a network node of a wireless communication network may provide communication of Non-Access Stratum (NAS) messages with a wireless terminal. The network node may include a network interface configured to provide network communication with other nodes of the wireless communication network, and a processor coupled to the network interface. The processor may be configured to derive an access network key for a NAS connection between the network node and the wireless terminal through a non-3GPP interworking function network node and a non-3GPP access network. The access network key may be derived based on a NAS count associated with the wireless terminal and responsive to receiving a registration request including an identifier of the wireless terminal. The processor may be configured to transmit a registration response to the N3IWF network node, with the registration response including the access network key for the NAS connection through the N3IWF network node and the non-3GPP access network. The processor may be configured to perform a security mode command procedure for the NAS connection through the N3IWF network node and the non-3GPP access network after transmitting the registration response.

According to more embodiments of inventive concepts, a network node of a wireless communication network may provide communication of Non-Access Stratum (NAS) messages with a wireless terminal. The network node may be adapted to derive an access network key for a NAS connection between the network node and the wireless terminal through a non-3GPP interworking function network node and a non-3GPP access network, with the access network key being derived based on a NAS count associated with the wireless terminal and responsive to receiving a registration request including an identifier of the wireless terminal. The network node may be adapted to transmit a registration response to the N3IWF network node, with the registration response including the access network key for the NAS connection through the N3IWF network node and the non-3GPP access network. The network node may be adapted to perform a security mode command procedure for the NAS connection through the N3IWF network node and the non-3GPP access network after transmitting the registration response.

According to some embodiments of inventive concepts, management of parallel NAS connections may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating an example of message organization for a security protected NAS message;

FIG. 2 is a table illustrating security header types of the security protected NAS message of FIG. 1;

FIGS. 3A and 3B illustrate use of a 128-bit integrity EIA process to authenticate the integrity of messages;

FIGS. 4A and 4B illustrate use of a 128-bit ciphering EEA process to cipher data of messages at a sender and at a receiver, respectively;

FIG. 14 illustrates process type distinguishers that may be used according to some embodiments of inventive concepts;

FIGS. 15 and 16 illustrate key derivations that may be used according to some embodiments of inventive concepts;

FIGS. 23A and 24A are flow charts illustrating operations of wireless terminals according to some embodiments of inventive concepts;

FIGS. 23B and 24B are block diagrams illustrating memory modules corresponding to flow charts of FIGS. 23A and 24A respectively;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
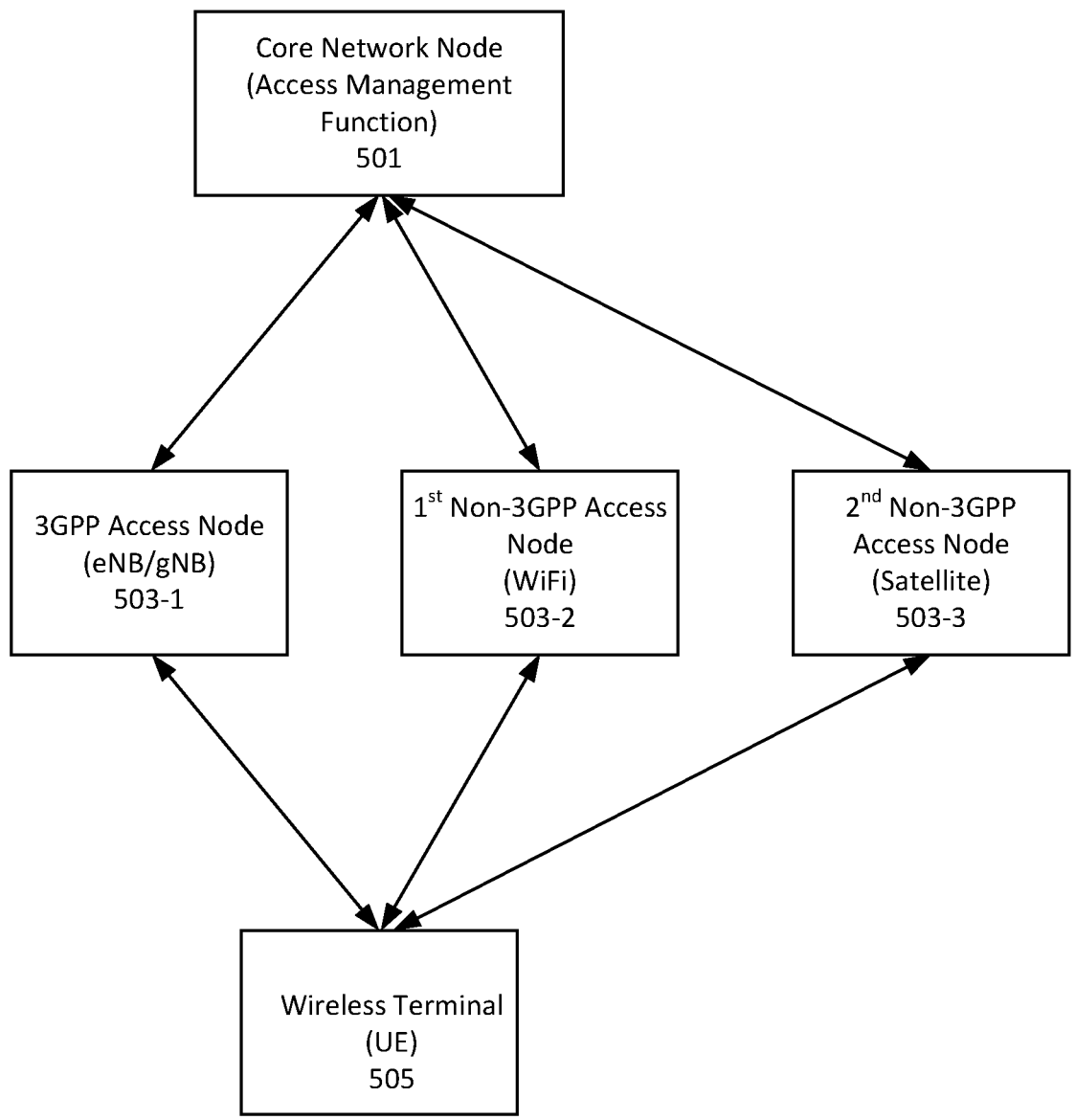
FIG. 5 is a block diagram illustrating multiple NAS connections between a core network node and a wireless terminal according to some embodiments of inventive concepts.

FIG. 5 is a block diagram illustrating multiple NAS connections between AMF core network node 501 (providing access management) and a wireless terminal UE 505 according to some embodiments of inventive concepts. As shown, a first NAS connection may be provided through a 3GPP access node (e.g., a base station, eNB, eNodeB, gNB, gNodeB), a second NAS connection may be provided through a first non-3GPP access node (e.g., a WiFi access node), and a third NAS connection may be provided through a second non-3GPP access node (e.g., a satellite node). With different NAS connections provided through different access nodes of different technologies, a likelihood that the receiving node (either the wireless terminal 505 in the downlink or the AMF core network node 501 in the uplink) receives all NAS messages in order may be reduced. While not shown in FIG. 5, coupling between non-3GPP access nodes (e.g., $1^{st}$ and $2^{nd}$ non-3GPP access nodes 503-2 and 503-3) and core network node AMF 501 may be provided through a non-3GPP inter-working function N3IWF network node.

Figure 6:
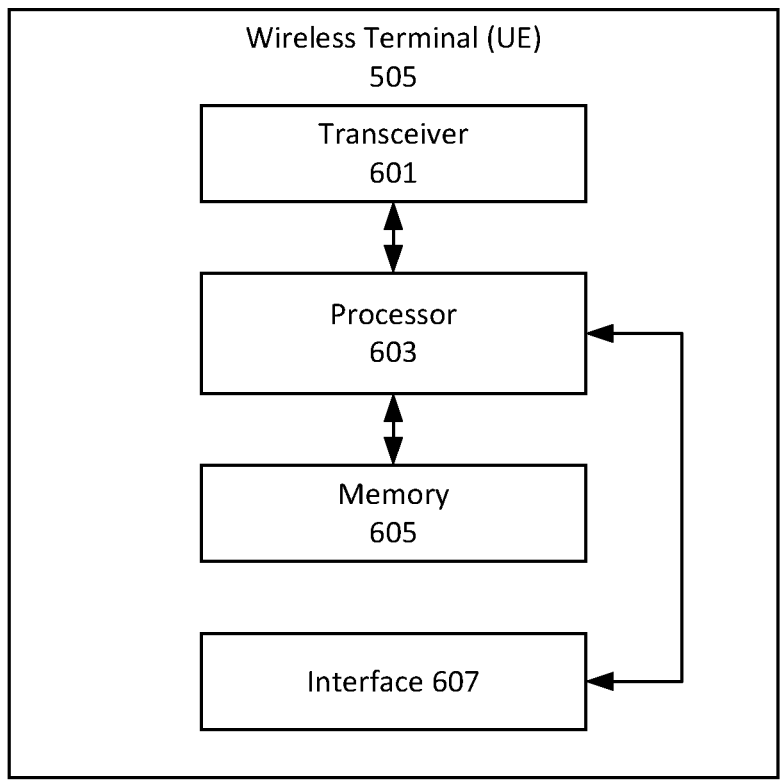
FIG. 6 is a block diagram illustrating elements of a wireless terminal UE according to some embodiments of inventive concepts.

FIG. 6 is a block diagram illustrating elements of a wireless terminal UE 505 (also referred to as a wireless device, a wireless communication device, a wireless communication terminal, user equipment, a user equipment node/terminal/device, etc.) configured to provide wireless communication according to embodiments of inventive concepts. As shown, wireless terminal UE may include a transceiver circuit 601 (also referred to as a transceiver) including a transmitter and a receiver configured to provide uplink and downlink radio communications with a base station(s) of a radio access network. Wireless terminal UE may also include a processor circuit 603 (also referred to as a processor) coupled to the transceiver circuit, and a memory circuit 605 (also referred to as memory) coupled to the processor circuit. The memory circuit 605 may include computer readable program code that when executed by the processor circuit 603 causes the processor circuit to perform operations according to embodiments disclosed herein. According to other embodiments, processor circuit 603 may be defined to include memory so that a separate memory circuit is not required. Wireless terminal UE may also include an interface 607 (such as a user interface) coupled with processor 603, and/or wireless terminal UE may be incorporated in a vehicle. User interface 607 may include, for example, a display (e.g., a touch screen) that provides visual output, a speaker that provides audio output, and/or a user input device (e.g., a touchscreen, keypad, button(s), etc.) that accepts user input.

As discussed herein, operations of wireless terminal UE 505 may be performed by processor 603 and/or transceiver 601. For example, processor 603 may control transceiver 601 to transmit communications through transceiver 601 over a radio interface to an access node and/or to receive communications through transceiver 601 from an access node over a radio interface. Moreover, modules may be stored in memory 605, and these modules may provide instructions so that when instructions of a module are executed by processor 603, processor 603 performs respective operations (e.g., operations discussed below with respect to Example Embodiments).

Figure 7:
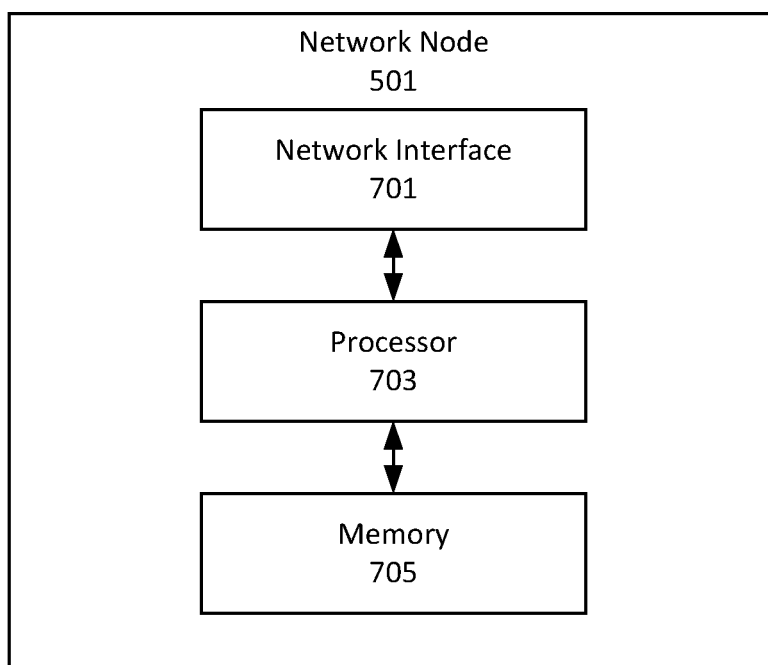
FIG. 7 is a block diagram illustrating elements of a network node according to some embodiments of inventive concepts.

FIG. 7 is a block diagram illustrating elements of a network node (also referred to as a core network node, base station, eNB, eNodeB, gNB, gNodeB, etc.) of a Radio Access Network (RAN) configured to support wireless communication according to embodiments of inventive concepts. As shown, the network node may include a network interface circuit 501 (also referred to as a network interface) including a transmitter and a receiver configured to provide uplink and downlink radio communications with wireless terminals, for example, through access nodes as shown in FIG. 5. The network node may also include a processor circuit 703 (also referred to as a processor) coupled to the network interface circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required.

As discussed herein, operations of the network node 501 may be performed by processor 703 and/or network interface 701. For example, processor 703 may control network interface 701 to transmit communications through network interface 701 to one or more access nodes and/or to receive communications through network interface from one or more access nodes as shown in FIG. 5. Moreover, modules may be stored in memory 705, and these modules may provide instructions so that when instructions of a module are executed by processor 703, processor 703 performs respective operations (e.g., operations discussed below with respect to Example Embodiments). While not shown in FIGS. 5 and 7, operations of 3GPP access node 503-1 and network node 501 may be combined by providing a transceiver in network node 501. In such embodiments, the transceiver of network node 501 may provide the 3GPP NAS connection via a direct 3GPP interface with wireless terminal 505. According to such embodiments, processor 703 may control the transceiver to transmit communication through the transceiver over a radio interface to wireless terminal 505 and/or to receive communications through the transceiver from wireless terminal 505.

A general message format and the information element coding for the NAS messages in EPC will now be discussed. While message formats are discussed by way of example with respect to 4G/EPC cases, the same and/or similar functionality and/or message information may be present for 5G with different format and/or structure.

For legacy EPC/LTE systems, TS 24.301 (also referred to as reference [3]) describes a general message format and information element coding for NAS messages. If the NAS message is a security protected NAS message, then the message includes the following parts:
- a) protocol discriminator;
- b) security header type;
- c) message authentication code (MAC);
- d) sequence number; and
- e) plain NAS message.

The organization of a security protected NAS message is illustrated in the example shown in FIG. 1 which illustrates a message organization for a security protected NAS message.

Bits 5 to 8 of the first octet of every EPS Mobility Management (EMM) message contain the Security header type IE. This IE includes control information related to the security protection of a NAS message. The total size of the Security header type IE is 4 bits. The Security header type IE can take the values shown in the table of FIG. 2 which illustrates security header types of the security protected NAS message of FIG. 1.

The Message authentication code (MAC) information element in FIG. 1 includes/contains the integrity protection information for the message. The MAC IE is included in the security protected NAS message if a valid EPS security context exists and security functions are started.

The Sequence number Information Element IE in FIG. 1 includes the NAS message sequence number (SN) which consists of the eight least significant bits of the NAS COUNT for a security protected NAS message.

When a NAS message is to be sent both ciphered and integrity protected, the NAS message is first ciphered and then the ciphered NAS message and the NAS sequence number (NAS COUNT) are integrity protected by calculating the MAC.

When a NAS message is to be sent with only integrity protection and unciphered, the unciphered NAS message and the NAS sequence number are integrity protected by calculating the MAC.

TS 33.401 (also referred to as reference [2]) and TS 24.301 (also referred to as reference [3]) describe that each separate KASME has a distinct pair of NAS COUNTs, one NAS COUNT for uplink and one NAS COUNT for downlink, associated with it.

The NAS COUNTs for a particular KASME are not reset to the start values (that is the NAS COUNTs only have their start value when a new KASME is created). This reduces/prevents a security issue of using the same NAS COUNTs with the same NAS keys (e.g., key stream re-use).

TS 24.301 (also referred to as reference [3]) describes that the sender uses its locally stored NAS COUNT as input to the integrity protection/verification process (also referred to as an integrity protection/verification algorithm) that is used to provide integrity and verification. The receiver uses the NAS sequence number included in the received message (or estimated from the 5 bits of the NAS sequence number received in the message) and an estimate for the NAS overflow counter to form the NAS COUNT input to the integrity verification process.

The integrity protection includes octets 6 to n of the security protected NAS message (i.e., the sequence number IE and the NAS message IE). After successful integrity protection validation, the receiver updates its corresponding locally stored NAS COUNT with the value of the estimated NAS COUNT for this NAS message.

Replay protection should/must assure that one and the same NAS message is not accepted twice by the receiver. Specifically, for a given EPS security context, a given NAS COUNT value shall be accepted at most one time and only if message integrity verifies correctly.

A 128-bit integrity process may be used in EPC/LTE. According to TS 33.401 (also referred to as reference [2]), the input parameters to the 128-bit integrity process are a 128-bit integrity key named KEY, a 32-bit COUNT (i.e. NAS COUNT), a 5-bit bearer identity called BEARER, the 1-bit direction of the transmission (i.e., DIRECTION), and the message itself (i.e., MESSAGE). The DIRECTION bit may/shall be 0 for uplink and 1 for downlink. The bit length of the MESSAGE is LENGTH. FIGS. 3A and 3B illustrate use of the 128-bit integrity process EIA to authenticate the integrity of messages. As shown in FIG. 3A, the sender may derive MAC-I/NAS-MAC, and as shown in FIG. 3B, the receiver may derive XMAC-I/XNAS-MAC.

Based on these input parameters the sender computes a 32-bit message authentication code (MAC-I/NAS-MAC) using the integrity process EIA (also referred to as the integrity algorithm EIA) of FIG. 3A. The message authentication code (MAC) is then appended to the message when sent as shown in FIG. 1. The receiver computes the expected message authentication code (XMAC-I/XNAS-MAC) on the message received (using the integrity process EIA of FIG. 3B, also referred to as an integrity algorithm) in the same way as the sender computed its message authentication code on the message sent and verifies the data integrity of the message by comparing the computed MAC to the received message authentication code (i.e., MAC-I/NAS-MAC).

TS 24.301 (also referred to as reference [3]) describes that the sender uses its locally stored NAS COUNT as input to the ciphering algorithm. The receiver uses the NAS sequence number included in the received message (or estimated from the 5 bits of the NAS sequence number received in the message) and an estimate for the NAS overflow counter to form the NAS COUNT input to the deciphering algorithm.

A 128-bit ciphering algorithm may be used. According to TS 33.401 (also referred to as reference [2]), the input parameters to the ciphering process (also referred to as a ciphering algorithm) are a 128-bit cipher key named KEY, a 32-bit COUNT (i.e., NAS COUNT), a 5-bit bearer identity BEARER, the 1-bit direction of the transmission (i.e., DIRECTION), and the length of the keystream required (i.e., LENGTH). The DIRECTION bit shall be 0 for uplink and 1 for downlink.

FIGS. 4A and 4B illustrate ciphering of data. Based on the input parameters, the EEA process generates the output keystream block KEYSTREAM which is used to encrypt the input plaintext block PLAINTEXT to produce the output ciphertext block CIPHERTEXT.

The support of multiple NAS connections terminated in the same AMF may give rise to new issues including future proofness, concurrency, agnosticism, and/or flexibility.

Regarding future proofness, the type categorization of accesses into 3GPP and non-3GPP is in fact future proof and can be applied to any new future access technology. Although it seems that there may be no need to support more than two NAS connections, it cannot be precluded with certainty that there will not be any future features or enhancements requiring the support of more than two simultaneous NAS connections, one over 3GPP and two over non-3GPP accesses (e.g., Wifi and satellite). For this reason, it may be better that the new security mechanism is not limited to two connections and that it efficiently supports an arbitrary (up to a limit) number of simultaneous connections.

Regarding concurrency, the introduction of multiple NAS connections may cause concurrency issues since it may now be possible for the system to run in parallel multiple NAS procedures over the different NAS legs. It is conceivable to mandate that the AMF executes the NAS procedures one at a time regardless of the NAS connection so that the underlying assumptions of the legacy security mechanism are preserved. This is not to be expected. For example, a failing NAS procedure on one NAS connection may put on hold all ongoing operations on the other NAS connection, for example, until a failure timer expires. This may be an undesirable design choice. Therefore, it may be better that the new security mechanism supports the parallel execution of NAS procedures on the different connections.

Regarding agnosticism, it is expected that the new security mechanism will provide the same security services regardless of the access type. The security services may include integrity, confidentiality, and replay protection. The security services should be provided in a manner that is transparent with respect to the access type, in line with the general design principle of an access agnostic 5G architecture.

Regarding flexibility, the new feature of multiple NAS connections may give rise to new scenarios which were not possible in legacy Systems. For example, one NAS connection over an access type could be constantly active while another one over a different access type, abusing terminology, flickers. More precisely, the UE may be registered over one NAS leg while oscillating between the two registration states on the other leg. This is not to mention, that the UE could meanwhile perform several handovers involving AMF changes. Therefore, the new security mechanism may desirably be flexible enough to support such mobility scenarios.

According to some embodiments of inventive concepts, methods may be provided to secure parallel NAS connections. Such methods may be based on partly sharing the security context so that the master key (KASME-equivalent in 5G) is shared for different NAS connections with the same wireless terminal, while for each NAS connection with the same wireless terminal there is a dedicated separate pair of NAS COUNTs based on use of a NAS parameter called NAS CONN ID (NAS Connection Identification) to identify each NAS connection with the same wireless terminal.

According to some embodiments, disclosed methods/devices may address issues relating to future proofness, concurrency, agnosticism, and flexibility, while providing a similar/same level of security services and protection relative to NAS connection as in legacy systems.

Regarding multiple NAS connections, the following assumptions may be made.

First, there may be an AMF-specific key denoted by KAMF which is the KASME-equivalent in 5G Systems. This key is established via a successful authentication and is used to derive the NAS protocol protection keys, i.e., KNASint and KNASenc.

Second, the system may provide/guarantee the in-order delivery of the NAS messages on each leg (connection). More particularly, the underlying NAS transport assumptions from legacy systems may still apply but per NAS connection, but this does not preclude the parallel executions of NAS procedures on different connections.

Third, the choice of the cryptographic processes (also referred to as cryptographic algorithms) may apply to all the NAS connections indiscriminately. In other words, it may be assumed that there is no NAS connection-specific security negotiation. It is expected that the negotiation takes place once during the establishment and activation of the AMF key, e.g., the NAS SMC procedure-equivalent in 5G. The NAS SMC (Security Mode Command) procedure is described in detail in TS 33.401 (also referred to as reference [2]).

Figure 8:
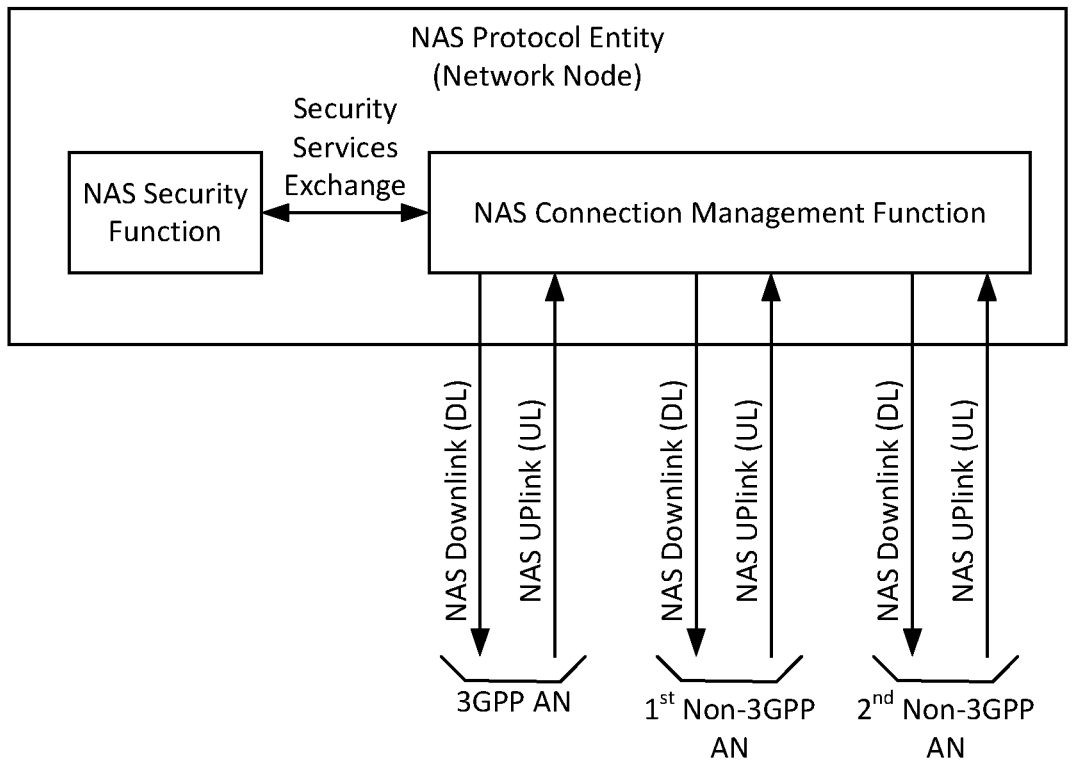
FIGS. 8 and 9 and block diagrams illustrating NAS Security Functions at the network node of FIGS. 5 and 7 and at the wireless terminal of FIGS. 5 and 6, respectively, according to some embodiments of inventive concepts.
Figure 9:
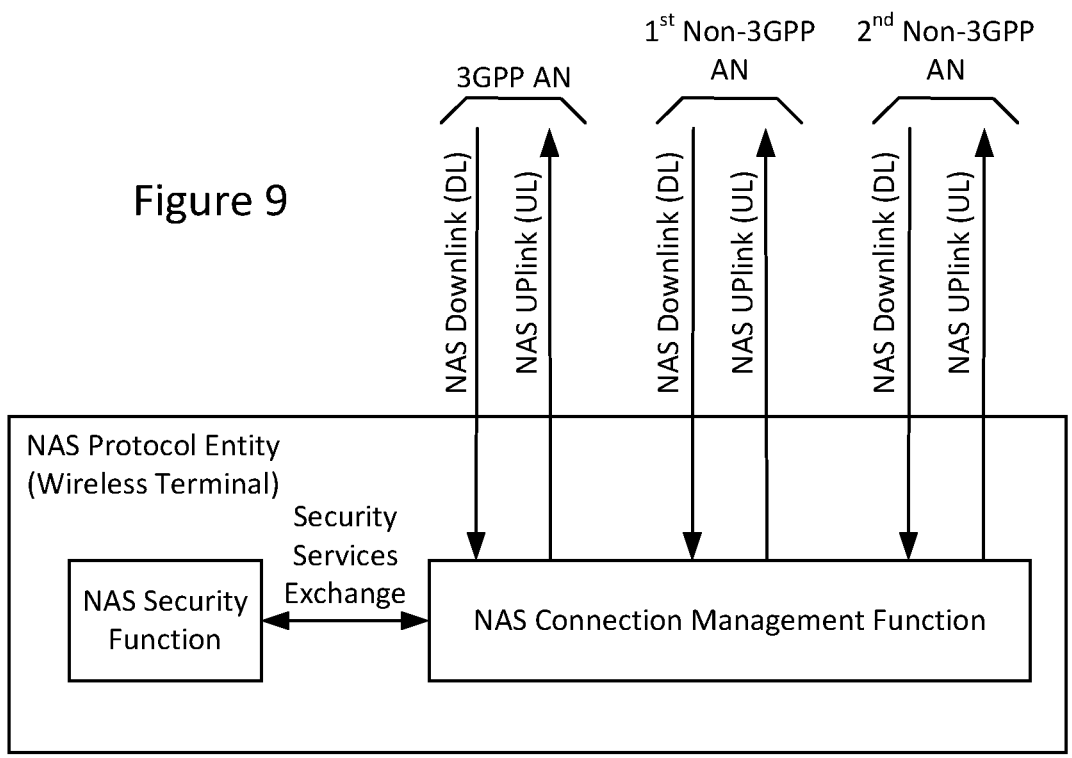

It may also be assumed that the NAS security is an additional function of NAS providing security services to the NAS protocol management entity as illustrated in FIGS. 8 and 9. Although, this could be left up to the implementation, the reference models of FIGS. 8 and 9 are provided as examples. For the reception of uplink NAS messages and transmission of downlink NAS messages, operations of the NAS Protocol Entity (including the NAS Security Function and the NAS Connection Management Function) of FIG. 8 may be performed by processor 703 of network node 501 (e.g., an AMF node). For the reception of downlink NAS messages and transmission of uplink NAS messages, operations of the NAS Protocol Entity (including the NAS Security Function and the NAS Connection Management Function) of FIG. 9 may be performed by processor 603 of wireless terminal 505 of FIG. 6.

For example, NAS security services may be provided by a standalone security function which interacts with the other NAS protocol entities or functions. For example, the NAS connection management function may forward protected messages received on the uplink to the security function which performs the checks and cryptographic operations and returns back the outcome (e.g., whether integrity check fails or passes, and/or whether the message is deciphered, etc.). When a message is to be protected on the downlink, the NAS connection management function provides the payload to the security function which performs the necessary operations and returns the protected message.

FIGS. 8 and 9 illustrate NAS Security Functions at a core network node and at a wireless terminal, respectively.

For 5G, it is expected that the NAS security context may include the AMF key KAMF, the derived protection keys KNASint and KNASenc, and the key set identifier eKSI-equivalent in 5G. According to some embodiments of the present disclosure, a separate pair of NAS COUNTs may be used for each NAS connection with a wireless terminal in this NAS security context.

As discussed above, for each NAS connection, a separate pair of NAS COUNTs, one for each direction, may be used/maintained. Since the security keys are shared and to reduce/avoid key stream reuse, methods for cryptographic separation may be used/required. For this purpose, a NAS connection-specific parameter may be introduced, and this NAS connection-specific parameter may be referred to as the NAS connection identifier and denoted by NAS CONN ID.

The NAS CONN ID is a number that is incremented each time a new NAS connection is set up for a wireless terminal. In the security context, each NAS COUNT pair is associated with a unique NAS CONN ID value. The new parameter is used as a differentiator when interacting with the NAS security function to indicate which NAS connection each message belongs to. To keep track of unallocated NAS CONN ID values, an additional parameter may be used/needed. This new parameter, denoted by NEXT NAS CONN ID may also be part of the security context. The NEXT NAS CONN ID parameter is initially set to 0 and is incremented whenever a new NAS connection is set up for a wireless terminal. Each time a new NAS connection is created for a wireless terminal, it is allocated as an identifier the current NEXT NAS CONN ID value. More particularly, a new NAS COUNT pair is created and is associated with a NAS CONN ID whose value is set to the current NEXT NAS CONN ID value. The NEXT NAS CONN ID value is then incremented. The NAS Connection Identification NAS CONN ID can thus be used as an input (directly or indirectly) for authentication and/or ciphering/deciphering processes.

According to some embodiments of inventive concepts, when a new NAS COUNT pair is created, the values of the counters are set to 0. The NAS CONN ID may be an 8-bit value that is used to pad the NAS COUNT 24-bit internal representation when constructing the input to the NAS ciphering/deciphering and/or integrity processes. In legacy systems, the padding may always be set to 0 as described in TS 24.301 (also referred to as reference [3]). Since each NAS connection is identified by a unique NAS CONN ID, the padding provides/guarantees cryptographic separation for the messages travelling over different NAS connections.

Figure 10A:
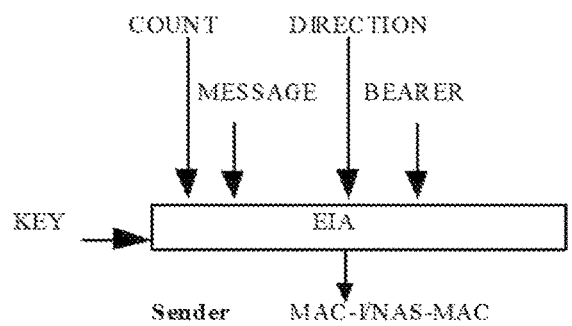
FIGS. 10A, 10B, 12A, and 12B illustrate use of an integrity process to authenticate integrity of NAS messages according to some embodiments of inventive concepts.
Figure 10B:
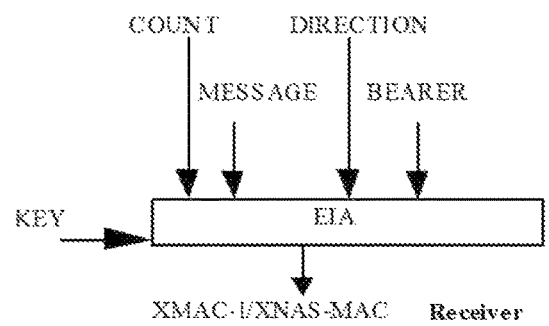

FIGS. 10A and 10B illustrate use of the integrity process EIA (also referred to as an integrity algorithm EIA) to authenticate the integrity of messages using the NAS CONN ID on the sender and receiver sides. By incorporating the NAS Connection Identification NAS CONN ID in the COUNT input, separation may be provided for authentication of different NAS connections for the same wireless terminal. The COUNT input, for example, may be a 32 bit value generated as a concatenation of the 8 bit NAS CONN ID for the NAS connection and the 24 bit NAS COUNT for the NAS connection (i.e., COUNT (32 bit)=NAS CONN ID (8 bit)||NAS COUNT (24 bit)). FIG. 10A thus illustrates use of the NAS CONN ID to derive MAC-I/NAS-MAC on the transmitter side, and FIG. 10B illustrates use of the NAS CONN ID to derive XMAC-I/XNAS-MAC on the receiver side.

Figure 11A:
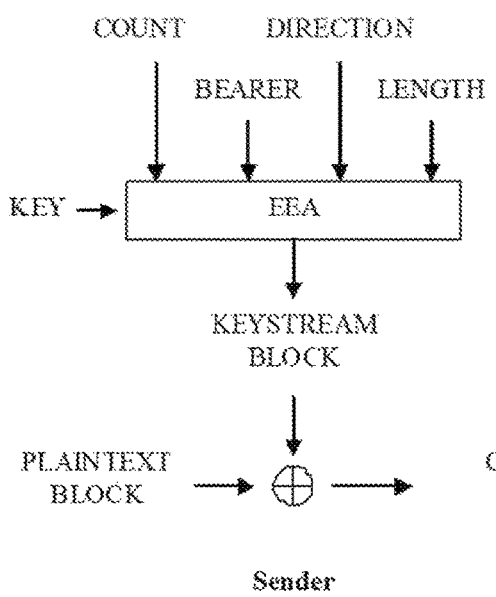
FIGS. 11A, 11B, 13A, and 13B illustrate use of a ciphering/deciphering process to cipher/decipher data of NAS messages according to some embodiments of inventive concepts.
Figure 11B:
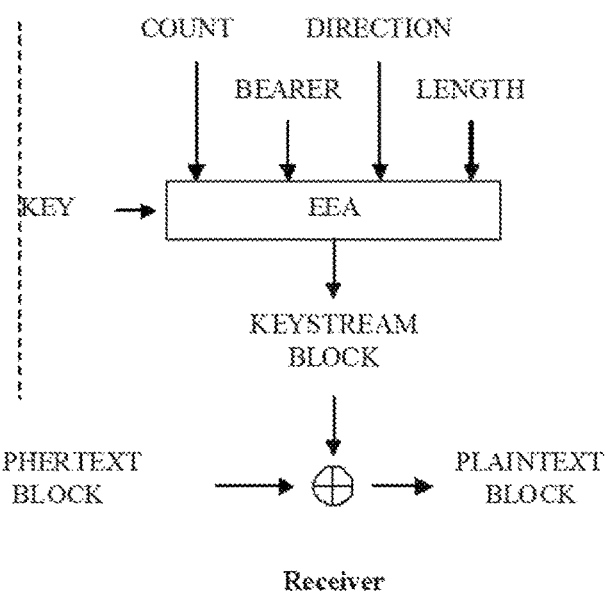

FIGS. 11A and 11B illustrate the use of the ciphering/deciphering algorithm EEA to cipher/decipher messages using the NAS CONN ID on the sender and receiver sides. By incorporating the NAS Connection Identification NAS CONN ID in the COUNT input, separation may be provided for ciphering/deciphering different NAS connections for the same wireless terminal. The COUNT input, for example, may be a 32 bit value generated as a concatenation of the 8 bit NAS CONN ID for the NAS connection and the 24 bit NAS COUNT for the NAS connection (i.e., COUNT (32 bit)=NAS CONN ID (8 bit)||NAS COUNT (24 bit)). FIG. 11A thus illustrates use of the NAS CONN ID to cipher the plaintext on the transmitter side, and FIG. 11B illustrates use of the NAS CONN ID to decipher the cipher text on the receiver side.

According to some other embodiments, the NAS CONN ID may be a 5-bit value that is used as the BEARER input for authentication and/or ciphering/deciphering processes as discussed below.

Figure 12A:
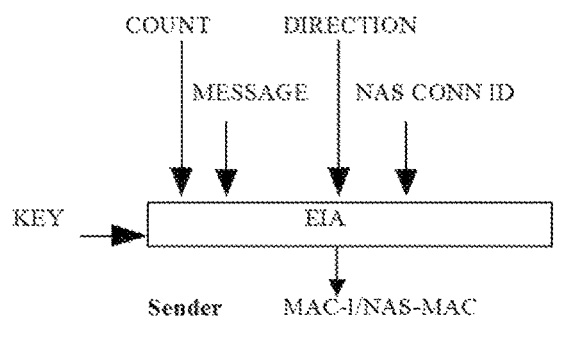
Figure 12B:
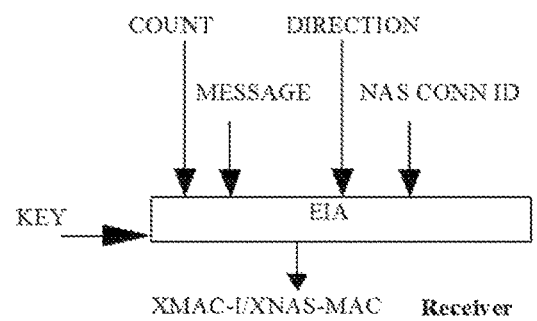

FIGS. 12A and 12B illustrate the use of the integrity algorithm EIA to authenticate the integrity of messages using the NAS CONN ID on the sender and receiver sides. By using the NAS Connection Identification NAS CONN ID as the BEARER input, separation may be provided for authentication of different NAS connections for the same wireless terminal. FIG. 12A thus illustrates use of the NAS CONN ID as the BEARER input to derive MAC-I/NAS-MAC on the transmitter side, and FIG. 12B illustrates use of the NAS CONN ID as the BEARER input to derive XMAC-I/XNAS-MAC on the receiver side.

Figure 13A:
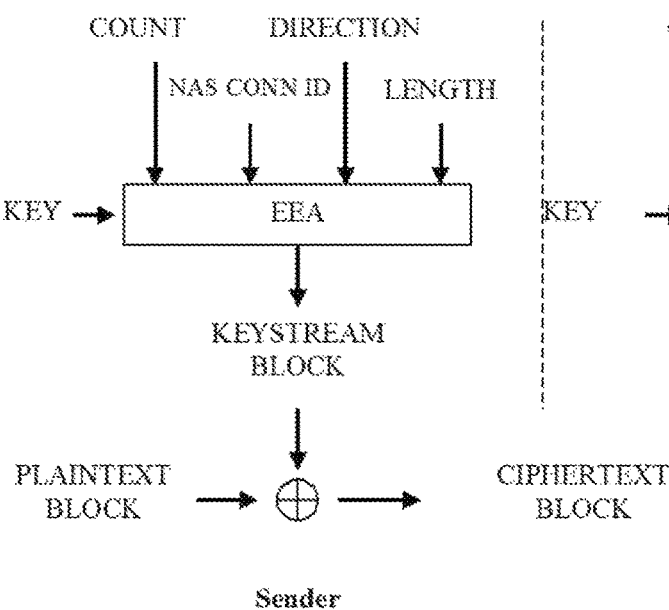
Figure 13B:
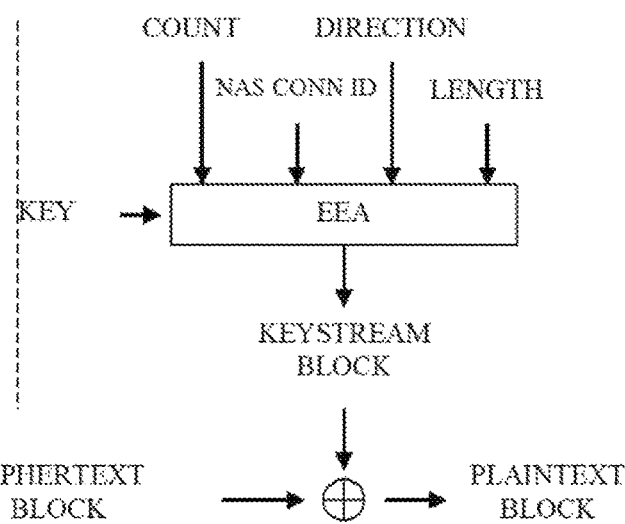

FIGS. 13A and 13B illustrate the use of the ciphering/deciphering process EEA to cipher/decipher messages using the NAS CONN ID on the sender and receiver sides. By using the NAS Connection Identification NAS CONN ID as the BEARER input, separation may be provided for ciphering/deciphering of different NAS connections for the same wireless terminal. FIG. 13A thus illustrates use of the NAS CONN ID as the BEARER input to cipher the plain text on the transmitter side, and FIG. 13B illustrates use of the NAS CONN ID as the BEARER input to decipher the cipher text on the receiver side.

Operations providing integrity authentication and/or ciphering/deciphering of FIGS. 10A-B, 11A-B, 12A-B, and/or 13A-B will now be discussed with respect to the flow chart of FIGS. 17A and 17B.

Operations of a communication node will now be discussed with reference to the flow chart of FIG. 17A and the modules of FIG. 17B. For example, modules of FIG. 17B may be stored in memory of the communication node (e.g., wireless terminal memory 605 of FIG. 6 if the communication node is a wireless terminal, or network node memory 705 of FIG. 7 if the communication node is a network node), and these modules may provide instructions so that when the instructions of a module are executed by the communication node processor (e.g., wireless terminal processor 603 if the communication node is a wireless terminal, or network node processor 705 if the communication node is a network node), the processor performs respective operations of the flow chart of FIG. 17A.

As discussed above with respect to FIG. 5, first and second NAS connections may be provided between first and second communication nodes, such as between wireless terminal 505 and network node 501 (e.g., a core network node). The communication node processor may provide a first NAS connection identification for a first NAS connection between the first and second communication nodes at block 1711 (e.g., using first identification module 1751). The communication node processor may also provide a second NAS connection identification for a second NAS connection between the first and second communication nodes at block 1713 (e.g., using second identification module 1753). Moreover, the first and second NAS connection identifications are different, and the first and second NAS connections are different.

For a communication over the first NAS connection at block 1717, the communication node processor may communicate a first NAS message between the first and second communication nodes over the first NAS connection (e.g., using first communication module 1757). More particularly, communicating the first NAS message may include at least one of performing integrity protection for the first NAS message using the first NAS connection identification and/or performing confidentiality protection for the first NAS message using the first NAS connection identification.

For a communication over the second NAS connection at block 1719, the communication node processor may communicate a second NAS message between the first and second communication nodes over the second NAS connection (e.g., using second communication module 1759). More particularly, communicating the second NAS message may include at least one of performing at least one of performing integrity protection for the second NAS message using the second NAS connection identification and/or performing confidentiality protection for the second NAS message using the second NAS connection identification.

The first and second NAS connections share a master key of a NAS security context. Moreover, communicating the first NAS message may include at least one of performing integrity protection for the first NAS message using the first NAS connection identification and the master key and/or performing confidentiality protection for the first NAS message using the first NAS connection identification and the master key. Similarly, communicating the second NAS message may include at least one of performing integrity protection for the second NAS message using the second NAS connection identification and the master key and/or performing confidentiality protection for the second NAS message using the second NAS connection identification and the master key.

Figure 17A:
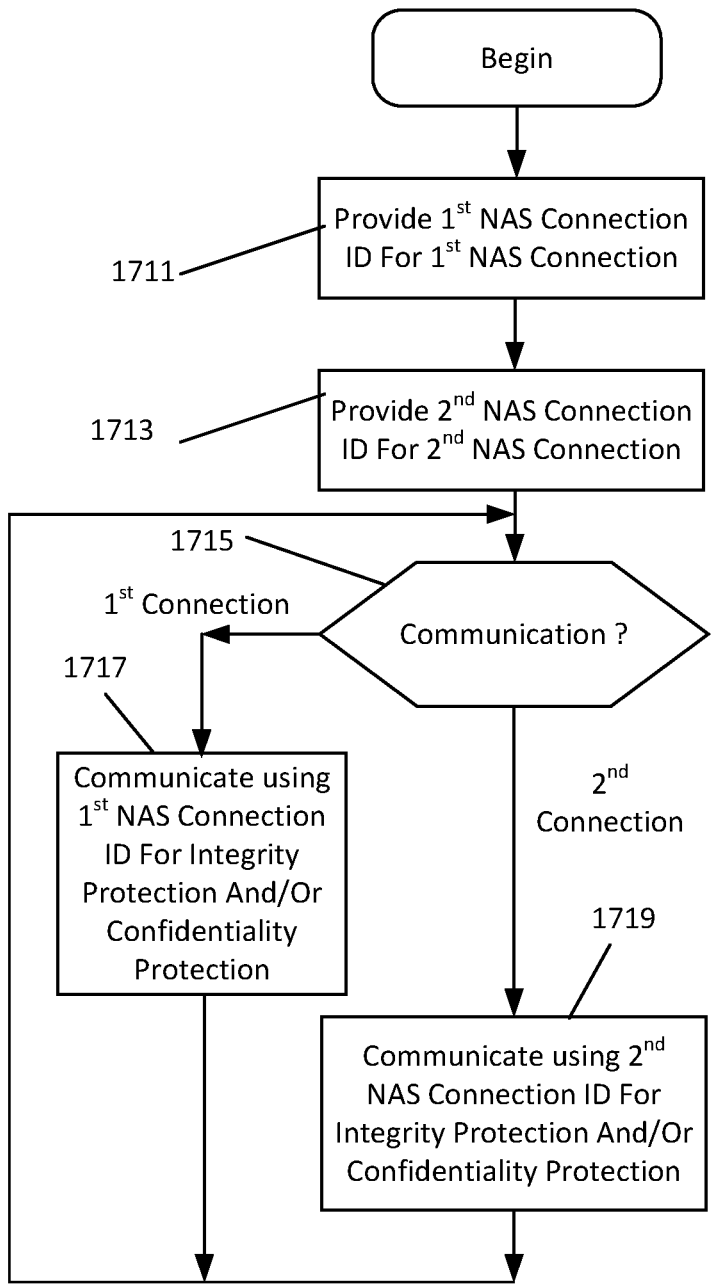
FIG. 17A is a flow chart illustrating operations of communicating NAS messages over multiple NAS connections according to some embodiments of inventive concepts.

Operations of FIG. 17A may be performed by a communication node that is transmitting NAS messages (e.g., wireless terminal 505 in the uplink, or network node 501 in the downlink). As discussed above, the first and second NAS connections may share a master key of a NAS security context. At block 1717, communicating the first NAS message may include performing integrity protection by generating a first message authentication code based on the first NAS connection identification, the master key, and the first NAS message, and transmitting the first NAS message with the first message authentication code over the first NAS connection to the second communication node. At block 1719, communicating the second NAS message may include performing integrity protection for the second NAS message by generating a second message authentication code based on the second NAS connection identification, the master key, and the second NAS message, and transmitting the second NAS message with the second message authentication code over the second NAS connection to the second communication node.

According to some embodiments for the transmitting node, the first NAS connection identification may be concatenated with a first NAS count for the first NAS message, the concatenation of the first NAS connection identification and the first NAS count may be provided as an input to generate the first message authentication code, the second NAS connection identification may be concatenated with a second NAS count for the second NAS message, and the concatenation of the second NAS connection identification and the second NAS count may be provided as an input to generate the second message authentication code. According to some other embodiments for the transmitting node, the first NAS connection identification may be provided as an input to generate the first message authentication code, and the second NAS connection identification may be provided as an input to generate the second message authentication code. According to still other embodiments for the transmitting node, the master key and the first NAS connection identification may be used to derive a first integrity protection key used to generate the first message authentication code, and the master key and the second NAS connection identification may be used to derive a second integrity protection key used to generate the second message authentication code. Moreover, performing integrity protection for the first NAS message may include performing integrity protection for the first NAS message using a 5G compatible EIA integrity protection interface, and performing integrity protection for the second NAS message may include performing integrity protection for the second NAS message using the 5G compatible EIA integrity protection interface.

Operations of FIG. 17A may be performed by a communication node that is transmitting NAS messages (e.g., wireless terminal 505 in the uplink, or network node 501 in the downlink). As discussed above, the first and second NAS connections may share a master key of a NAS security context. At block 1717, communicating the first NAS message may include performing confidentiality protection for the first NAS message by ciphering the first NAS message using the first NAS connection identification and the master key to provide a first ciphered NAS message, and transmitting the first ciphered NAS message over the first NAS connection to the second communication node. At block 1719, communicating the second NAS message may include performing confidentiality protection for the second NAS message by ciphering the second NAS message using the second NAS connection identification and the master key to provide a second ciphered NAS message, and transmitting the second ciphered NAS message over the second NAS connection to the second communication node.

According to some embodiments for the transmitting node, the first NAS connection identification may be concatenated with a first NAS count for the first NAS message, the concatenation of the first NAS connection identification and the first NAS count may be provided as an input to generate the first ciphered NAS message, the second NAS connection identification may be concatenated with a second NAS count for the second NAS message, and the concatenation of the second NAS connection identification and the second NAS count may be provided as an input to generate the second ciphered NAS message. According to some other embodiments of the transmitting node, the first NAS connection identification may be provided as an input to generate the first ciphered NAS message, and the second NAS connection identification may be provided as an input to generate the second ciphered NAS message. According to still other embodiments of the transmitting node, the master key and the first NAS connection identification may be used to derive a first ciphering key that is used to generate the first ciphered NAS message, and the master key and the second NAS connection identification may be used to derive a second ciphering key that is used to generate the second ciphered NAS message. The ciphering the first NAS message may include ciphering the first NAS message using EEA ciphering, and the ciphering the second NAS message comprises ciphering the second NAS message using the EEA ciphering. Moreover, performing confidentiality protection for the first NAS message may include performing confidentiality protection for the first NAS message using a 5G compatible EEA ciphering interface, and performing confidentiality protection for the second NAS message may include performing confidentiality protection for the second NAS message using the 5G compatible EEA ciphering interface.

Operations of FIG. 17A may be performed by a communication node that is receiving NAS messages (e.g., a wireless terminal on the downlink, or a network node of the uplink). As discussed above, the first and second NAS connections may share a master key of a NAS security context. At block 1715, communicating the first NAS message may include receiving the first NAS message with a first message authentication code over the first NAS connection from the second communication node, performing the integrity protection of the first NAS message by generating a first derived message authentication code for the first NAS message based on the first NAS connection identification, the master key, and the first NAS message, and processing the first NAS message responsive to the first message authentication code and the first derived message authentication code matching. At block 1719, communicating the second NAS message may include receiving the second NAS message with a second message authentication code over the second NAS connection from the second communication node, performing the integrity protection for the second NAS message by generating a second derived message authentication code for the second NAS message based on the second NAS connection identification, the master key, and the second NAS message, and processing the second NAS message responsive to the second message authentication code and the second derived message authentication code matching.

According to some embodiments for the receiving node, the first NAS connection identification may be concatenated with a first NAS count for the first NAS message, the concatenation of the first NAS connection identification and the first NAS count may be provided as an input to generate the first derived message authentication code, the second NAS connection identification may be concatenated with a second NAS count for the second NAS message, and the concatenation of the second NAS connection identification and the second NAS count may be provided as an input to generate the second derived message authentication code. According to some other embodiments for the receiving node, the first NAS connection identification may be provided as an input to generate the first derived message authentication code, and the second NAS connection identification may be provided as an input to generate the second derived message authentication code. According to still other embodiments for the receiving node, the master key and the first NAS connection identification may be used to derive a first integrity protection key used to generate the first derived message authentication code, and the master key and the second NAS connection identification may be used to derive a second integrity protection key used to generate the second derived message authentication code. Moreover, performing integrity protection for the first NAS message may include performing integrity protection for the first NAS message using a 5G compatible EIA integrity protection interface, and performing integrity protection for the second NAS message may include performing integrity protection for the second NAS message using the 5G compatible EIA integrity protection interface.

Operations of FIG. 17A may be performed by a communication node that is receiving NAS messages (e.g., a wireless terminal on the downlink, or a network node of the uplink). As discussed above, the first and second NAS connections may share a master key of a NAS security context. At block 1717, communicating the first NAS message may include receiving a first ciphered NAS message over the first NAS connection from the second communication node, performing confidentiality protection for the first NAS message by deciphering the first ciphered NAS message using the first NAS connection identification and the master key to provide a first deciphered NAS message, and processing the first deciphered NAS message. At block 1719, communicating the second NAS message may include receiving a second ciphered NAS message over the second NAS connection from the second communication node, performing confidentiality protection for the second NAS message by deciphering the second ciphered NAS message using the second NAS connection identification and the master key to provide a second deciphered NAS message, and processing the second deciphered NAS message.

According to some embodiments for the receiving node, the first NAS connection identification may be concatenated with a first NAS count for the first NAS message, the concatenation of the first NAS connection identification and the first NAS count may be provided as an input to generate the first deciphered NAS message, the second NAS connection identification may be concatenated with a second NAS count for the second NAS message, and the concatenation of the second NAS connection identification and the second NAS count may be provided as an input to generate the second ciphered NAS message. According to some other embodiments for the receiving node, the first NAS connection identification may be provided as an input to generate the first deciphered NAS message, and the second NAS connection identification may be provided as an input to generate the second deciphered NAS message. According to still other embodiments for the receiving node, the master key and the first NAS connection identification may be used to derive a first deciphering key used to generate the first deciphered NAS message, and the master key and the second NAS connection identification may be used to derive a second deciphering key used to generate the second deciphered NAS message. Moreover, performing confidentiality protection for the first NAS message may include performing confidentiality protection for the first NAS message using a 5G compatible EEA deciphering interface, and performing confidentiality protection for the second NAS message may include performing confidentiality protection for the second NAS message using the 5G compatible EEA deciphering interface.

In embodiments of FIG. 17A, the first NAS connection may be provided through a 3GPP access node between the first and second communication nodes, and the second NAS connection may be provided through a non-3GPP access node between the first and second communication nodes; or the first NAS connection may be provided through a non-3GPP access node between the first and second communication nodes and the second NAS connection may be provided through a 3GPP access node between the first and second communication nodes. For example, the 3GPP access node may include a radio access network base station, and the non-3GPP access node may include at least one of a WiFi access node and/or a satellite access node.

Moreover, the first and second NAS connections of FIG. 17A may be maintained concurrently between the first and second communication nodes. In addition, a Packet Data Unit (PDU) session may be established based on the first and second NAS messages to communicate user plane data between the first and second communication nodes.

Figure 17B:
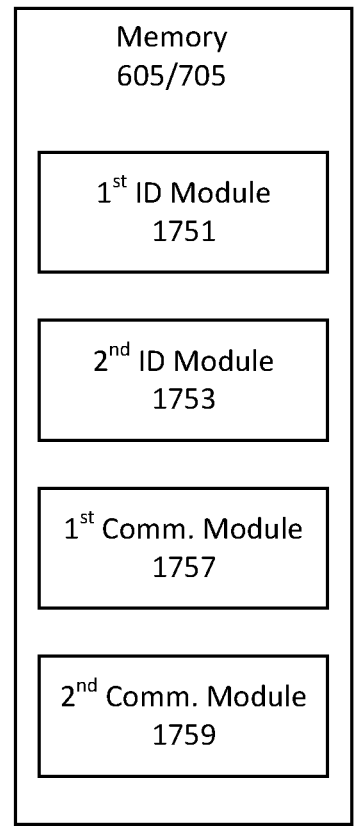
FIG. 17B is a block diagram illustrating memory modules corresponding to operations of FIG. 17A according to some embodiments of inventive concepts.

Various operations of FIG. 17A and/or modules of FIG. 17B may be optional with respect to some embodiments of communication nodes and related methods. Regarding methods of example embodiment 1 (set forth below), for example, operations of block 1715 of FIG. 17B may be optional.

According to some other embodiments of inventive concepts, cryptographic separation may be provided at the level of the keys. NAS protection keys may be derived in legacy systems as described in TS 33.401 (also referred to as reference [2]).

In general, all key derivations (including input parameter encoding) for LTE may be performed using the key derivation function (KDF) specified in TS 33.220 (also referred to as reference [4]). The KDF takes in as input a key and a string S. The derived key is obtained by applying the HMAC-SHA-256 (described in RFC 2104, also referred to as reference [5]) to the input key and string S. The string S is constructed by concatenating a distinguisher parameter referred to as FC and a set of other parameters and their respective lengths: S=FC∥P0∥L0∥P1∥L11∥P2∥L2∥P3∥L3∥ . . . ∥Pn∥Ln, where Pi (i from 0 to n) is a parameter and Li is its length in octets.

According to clause A.7 of TS 33.401 (also referred to as reference [2]), when deriving keys for NAS integrity and NAS encryption processes (also referred to as algorithms) from KASME and process/algorithm types and IDs, the following parameters may/shall be used to form the string S.

FC=0x15

P0=process type distinguisher

P0=length of process type distinguisher (i.e. 0x00 0x01)
P1=process identity
L1=length of process identity (i.e. 0x00 0x01)

The process type distinguisher shall be NAS-enc-alg for NAS encryption processes and NAS-int-alg for NAS integrity protection processes. (see table A.7-1). FIG. 14 is a table illustrating process type distinguishers.

The process identity (as specified in clause 5 of TS 33.401, also referred to as reference [2]) may/shall be put in the four least significant bits of the octet. The two least significant bits of the four most significant bits may be reserved for future use, and the two most significant bits of the most significant nibble may be reserved for private use. The entire four most significant bits may/shall be set to all zeros.

For NAS process key derivations, the input key may/shall be the 256-bit KASME. For a process key of length n bits, where n is less or equal to 256, the n least significant bits of the 256 bits of the KDF output may/shall be used as the process key (also referred to as an algorithm key).

As discussed above with respect to FIGS. 10A-B, 11A-B, 12A-B, and 13A-B, the NAS Connection Identifier NAS CONN ID may be used in the authentication and/or ciphering/deciphering processes to provide separation for different NAS connections used by a same wireless terminal.

According to some embodiments, the NAS CONN ID may be used in the derivation of the NAS protection keys KNASenc and KNASint. The resulting protection keys may thus be NAS connection-specific to provide separation for different NAS connections used by the same wireless terminal.

For example, a new parameter P2 may be introduced for the construction of the input S string. This parameter P2 would be the NAS CONN ID and its length L2 would be whatever length the NAS CONN ID has (in octets). For example, if the NAS CONN ID is 8 bits long then L2 is 1 (for one octet). If the NAS CONN ID is specified to be a 32-bits long value, then L2 would be set to the constant 4 (for four octets). All the other parameters (P0, P1) may remain the same or may be based on the 5G-equivalents.

FIG. 15 illustrates Key derivation based on the S string where the NAS CONN ID is used in the derivation of the S string. Here, the master key KAMF and S are provided as inputs to the key derivation function KDF to generate the KEY K that is used for EIA authentication and/or EEA ciphering/deciphering. In FIG. 15:

KAMF is the KASME-equivalent in 5G;
S is constructed as the concatenation FC||P0||L0||P1||L1||P2||L2 where:
  FC is potentially a new distinguisher for the derivation of the NAS protection key,
  P0, P1, L0 and L1 are based on potentially new parameters and values equivalent to the ones used in the LTE. In fact, the algorithms in 5G could potentially have other names and other type distinguisher values, etc.,
  P2 and L2 are the new parameters based on the NAS CONN ID.

Depending on the FC value, the same procedure is used to derive a NAS integrity protection key or a NAS ciphering key. Since the NAS CONN ID is used in the derivation function, those keys would be then NAS connection specific.

According to some other embodiments, the NAS CONN ID may be used to derive a new level key KNAS from the KAMF key which is then used to derive the other lower level protection keys. The KNAS and the derived protection keys may thus be NAS connection-specific.

For example, a new key called KNAS may be derived from the KAMF as shown in FIG. 16 where S is set to FC||P0||L0 with FC having a new value and P0, L0 corresponding to the NAS CONN ID. In fact, P0 and L0 are defined similarly to P2 and L2 as discussed above with respect to FIG. 15. Because the NAS CONN ID is used in the derivation of this new intermediary key, it is thus NAS connection specific. Everything that is subsequently derived from the KNAS key would be also NAS connection specific. Therefore, it is proposed to derive the NAS protection key KNASint and KNASenc from the KNAS similarly to how it is done in legacy systems when they are derived from the KASME.

The overall key derivation scheme producing the NAS protection keys may thus be provided as illustrated in FIG. 16. In embodiments of providing key derivation based on the NAS CONN ID, a larger number of connection specific parameters may be used/needed compared to embodiments discussed above with respect to FIGS. 10A-B, 11A-B, 12A-B, and 13A-B.

Figure 18:
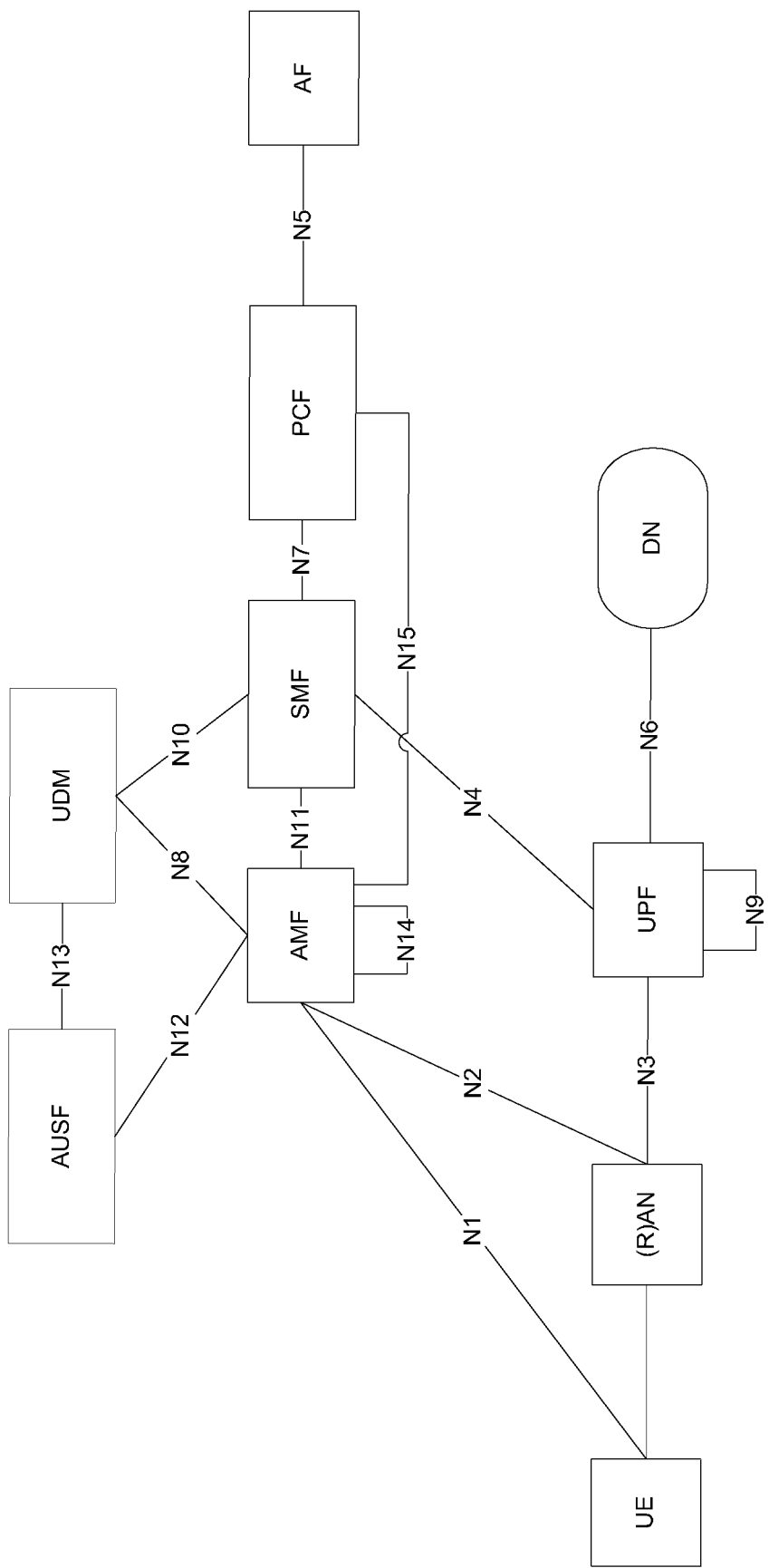
FIG. 18 is a block diagram illustrating a non-roaming 5G system architecture in a reference point representation.
Figure 19:
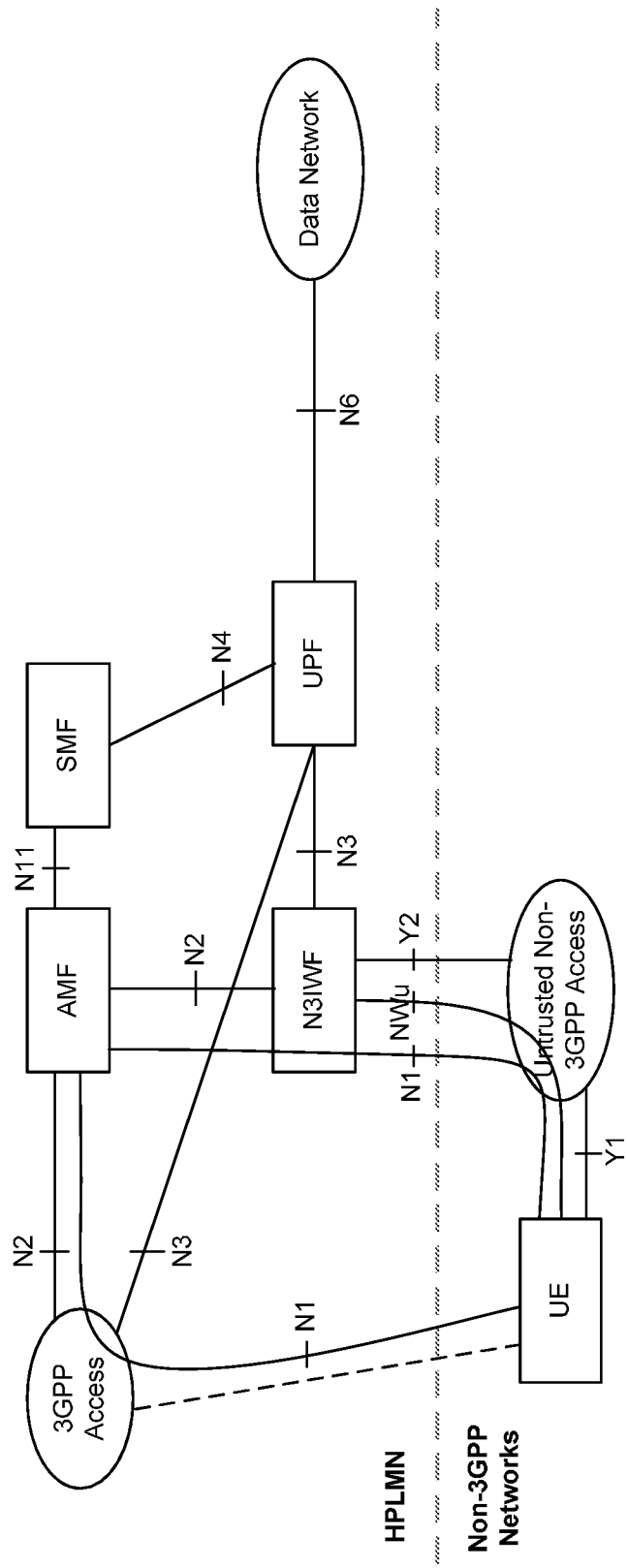
FIG. 19 is a block diagram illustrating a non-roaming 5G core network architecture with non-3GPP access.

FIG. 18 illustrates a non-roaming 5G architecture, and FIG. 19 illustrates a non-roaming architecture with non-3GPP access. As shown in FIG. 18, wireless terminal UE and Access Management Function AMF (also referred to as network node AMF) may be coupled over a N1 interface (e.g., through Access Network AN), and Access Network AN and Access Management Function AMF may be coupled over a N2 interface. AMF may be coupled with Authentication Server Function AUSF (also referred to as network node AUSF), User Data Management UDM (also referred to as network node UDM), and Packet Control Function PCF (also referred to as network node PCF) over respective N12, N8, and N15 interfaces. UDM may be coupled with AUSF and Session Management Function SMF (also referred to as network node SMF) over respective N13 and N10 interfaces. PCF may be coupled with SMF and Application Function AF (also referred to as network node AF) over respective N7 and N5 interfaces. FIG. 18 further shows that User Plane Function UPF (also referred to as network node UPF) may be coupled with AN, SMF, and Data Network DN over respective N3, N4, and N6 interfaces. FIG. 18 further shows that interface N14 may provide coupling within AMF and that interface N9 may provide coupling within UPF.

As further shown in FIG. 19, wireless terminal UE may also access AMF via an untrusted non-3GPP access and a non-3GPP access InterWorking Function N3IWF (also referred to as network node N3IWF). Here, wireless terminal UE may be coupled with the non-3GPP access network over a Y1 interface, with N3IWF over an NWu interface (through the non-3GPP access network), and with AMF over an N1 interface (through the non-3GPP access network and N3IWF). Moreover, N3IWF may be coupled with AMF through an N2 interface, N3IWF may be coupled with the non-3GPP access network through a Y2 interface, and N3IWF may be coupled with UPF over an N3 interface. Additional information regarding different functions and reference points/interfaces can be found in TS 23.501 (also referred to as reference [1]).

In the context of the present disclosure, the Access Management Function AMF may be connected to the Access Network AN (Radio Access Network RAN in FIG. 18 and non-3GPP network interworking function N3IWF in FIG. 19) over the same reference point N2 (also referred to as the N2 interface) regardless of the type of access. Per TS 23.501 (also referred to as reference [1]) definition, N2 is the reference point between the (R)AN and the AMF. This is in line with an aspect of the 5G Core, that it is to be agnostic to the type of access network.

In a 4G system, the equivalent of N2 is the S1-MME reference point between the MME and the eNB. The integration of non-3GPP access may be achieved in different ways. For example, for untrusted non-3GPP access, there may be no NAS signaling between the UE and the Core Network while in 5G, and the UE may be able to establish a NAS connection with the core network over this type of access. The security features in 4G systems may be such that the access network key for 3GPP access (KeNB) is provided by the MME to the RAN following the reception of an extended service request or Tracking Area Update TAU with the active flag set messages from the UE as described in TS 33.401 (also referred to as reference [2]). For untrusted non-3GPP access, the IPsec tunnel security association between the enhanced Packet Data Gateway ePDG and the wireless terminal UE may be established based on the key derived from the authentication procedure. Accordingly, the mechanism for key establishment and distribution may be totally different between the two accesses.

In 5G, at least for 3GPP access, similar procedures are expected to trigger the establishment and delivery of the access keys from the AMF node to the gNB over the N2 reference point. For 3GPP access, a preliminary security solution for registration over non-3GPP access has been agreed in clause 11 of TS 33.899 (also referred to as reference [6]). In this solution, the access network key used to complete the IPsec tunnel between the UE and the N3IWF may be sent from the AMF node to the N3IWF node in the final message of the authentication procedure.

Cryptographic separation may be provided as discussed above while securing parallel NAS connections using the same keys. More particularly, for each NAS connection, a separate pair of NAS COUNT values, one for each direction (UPLINK or UL and DOWNLINK or DL), is maintained. The NAS COUNT values would then be handled in a similar manner to how it is done in 4G systems as discussed in reference [2]. Since the security keys are shared and to reduce/avoid key stream reuse, a new NAS connection-specific parameter is introduced, called the NAS connection identifier, denoted by NAS CONN ID, NAS CID, or CID for short. Derivation of such access network keys and distribution of the network access keys to the different accesses are discussed in greater detail below. As used herein, the term access network may refer to 3GPP access nodes/entities (e.g., gNB) and non-3GPP access nodes/entities (e.g., N3IWF).

Generation of new non-3GPP access network keys using an existing anchor key and security context in the AMF node (if any) is also discussed. In 4G systems, it may be possible to generate new and fresh KeNBs from an existing KASME whenever needed (e.g., during mobility events). A similar mechanism may be useful for non-3GPP accesses. For example, a mobility scenario may exist where a UE that is registered over a 3GPP access and that has established a security context with the AMF node, registers, deregisters and then registers again on a non-3GPP access. Another possible scenario would be a UE that is registered over a 3GPP access and that has established a security context with the AMF node, registers and moves to the connected state (CM-CONNECTED), changes to idle state (CM-IDLE), and then moves back to connected state again. It is unlikely that the N3IWF node keeps the IKE security association when the UE deregisters or once the UE moves to idle.

If a 4G mechanism to derive the KeNB is reused and generalized to non-3GPP access, the same key may be derived for both accesses. As described in clause A.3 of TS 33.401 (also referred to as reference [2]), when deriving a KeNB from KASME and the uplink NAS COUNT in the UE and the MME, the below listed parameters shall be used to form the input S to the Key Derivation Function (KDF).

FC=0x11
P0=Uplink NAS COUNT,
L0=length of uplink NAS COUNT (i.e. 0x00 0x04)
The input key shall be the 256-bit KASME.

The NAS UL COUNT value used is the actual uplink count value of 3-byte length padded with a 0 byte. So, if the NAS UL COUNT is used as described herein without considering, for example, improvements discussed above, then it may be possible to use the same NAS UL COUNT value when deriving access network keys (e.g., first for 3GPP access and later for non-3GPP access). This may lead to key stream reuse and may be undesirable/unacceptable.

Another issue is related to the distribution of the access network keys and how to harmonize that for different types of accesses. Although, the aim is to achieve independence of the type of the access, functional dependencies may be introduced in the specifications such as TS 23.501 (also referred to as reference [1]). For example, the AMF node will maintain two registration states and connection states, one per access type. To achieve that, the AMF node may need to be able to determine the type of the access over which a NAS connection is established. In addition, a solution for non-3GPP access may assume delivery of the first AN key (from the CN to the AN) in the last message of the authentication procedure before the establishment of NAS security. That may never be the case, at least in 4G mechanisms, for 3GPP access and is expected to remain so in 5G systems.

According to some embodiments of inventive concepts, derivation and establishment of access network keys may be provided in an agnostic manner with respect to the type of the access, to the extent possible. According to some embodiments of inventive concepts, NAS Connection Identifiers discussed above may be used to derive access network keys. This may enable reusing 4G mechanisms for distribution of access network keys over both types of accesses.

According to some embodiments of inventive concepts, mechanisms may be provided to establish access network security keys that may be used to set up an IPsec tunnel over untrusted non-3GPP access and/or to derive subsequent key material for 3GPP access. Moreover, such mechanisms may be provided independent of a type of access network. According to some embodiments of inventive concepts, 3GPP access-specific security mechanisms may be reused to establish, refresh, and/or distribute access network keys also for non-3GPP access. According to some embodiments of inventive concepts, freshness of access network keys used for non-3GPP access may be provided/guaranteed, and/or key stream reuse across different access network types may be reduced/prevented. According to some embodiments of inventive concepts, a need for re-authentication over non-3GPP access during reregistration (e.g., in case a security context is already established over 3GPP access between the UE and the AMF) may be reduced/removed.

As an initial assumption according to some embodiments of inventive concepts, the wireless terminal UE and the AMF node may have established a security context and may use mechanisms described above with respect to FIGS. 10A-B, 11A-B, 12A-B, 13A-B, 14-16, and 17A-B for the protection of the NAS messages over the N1 reference point. In addition, it may be expected that for 5G, the NAS security context may include the AMF key KAMF, the derived protection keys KNASint and KNASenc, and the key set identifier eKSI-equivalent in 5G. Now following the initial assumption, the security context may include a separate pair of NAS COUNTs (per access network type), one pair for each NAS connection, and each NAS connection may be identified by a unique NAS CONNECTION ID value, also referred to as a NAS CID value or a CID value for short.

According to some embodiments of inventive concepts, access Network Key derivation may be provided using a NAS CID. The NAS CID discussed above may be used for the derivation of the access network key. More particularly, when deriving an access network key from the KAMF and the uplink NAS COUNT in the UE and the AMF, the following parameters shall be used to form the input S to the Key Derivation Function KDF:

FC=0x11 or whatever value is specified for the purpose,
P0=Extended Uplink NAS COUNT, and
L0=length of uplink NAS COUNT (i.e. 0x00 0x04).

The input key shall be the 256-bit KAMF, and the Extended Uplink NAS COUNT is constructed as follows:

Extended Uplink NAS COUNT:=NAS CID||Uplink NAS COUNT, where the NAS CID is the identifier of the NAS connection established over the access network for which the key is needed, and the Uplink NAS COUNT is the current NAS UL COUNT value associated to that NAS CID (or corresponding NAS connection).

In this way, by using the NAS CID, it may be provided/guaranteed that all access network keys generated for one access are cryptographically separated from the keys generated for the other type of access. The reuse of the NAS UL COUNT from 4G systems may also provide/guarantee that keys generated for the same access are cryptographically separated from each other since the use of the NAS COUNT provides freshness. A variant of this embodiment is that the NAS CID may be taken in the key derivation as a separate parameter instead of being part of the extended UL NAS Count.

According to some embodiments of inventive concepts, static NAS connection identifiers may be used. According to such embodiments, mechanisms discussed above may be reused where the NAS CID values are allocated dynamically. However, it may be possible to use mechanisms of above embodiments using an extended UL NAS COUNT (=NAS CID||Uplink NAS COUNT) as P0 with statically allocated CID values. More particularly, it may be possible to assume that each NAS connection is assigned a fixed NAS CID value depending on the type of the access (e.g., 0 for 3GPP access and 1 for non-3GPP access). Any such fixed values may need to be standardized for interoperability. Such embodiments, however, may introduce a dependency between the security mechanism and the access type, which may be contrary to an access agnostic 5G Core architecture.

According to some embodiments of inventive concepts, different FC (process distinguisher) values may be used. While mechanisms described in previous embodiments may achieve cryptographic separation via use of the NAS CID value, it may be possible to instead use different FC values. More particularly, a legacy mechanism may be reused as is, except that for 3GPP access, a fixed FC value is used while for non-3GPP access another FC value is used. Accordingly, the use of yet another differentiating parameter such as the CID may no longer be needed. Similar to the previous embodiment, this embodiment may also introduce a dependency between a security mechanism and an access type which may be contrary to an access agnostic 5G Core architecture.

Figure 20:
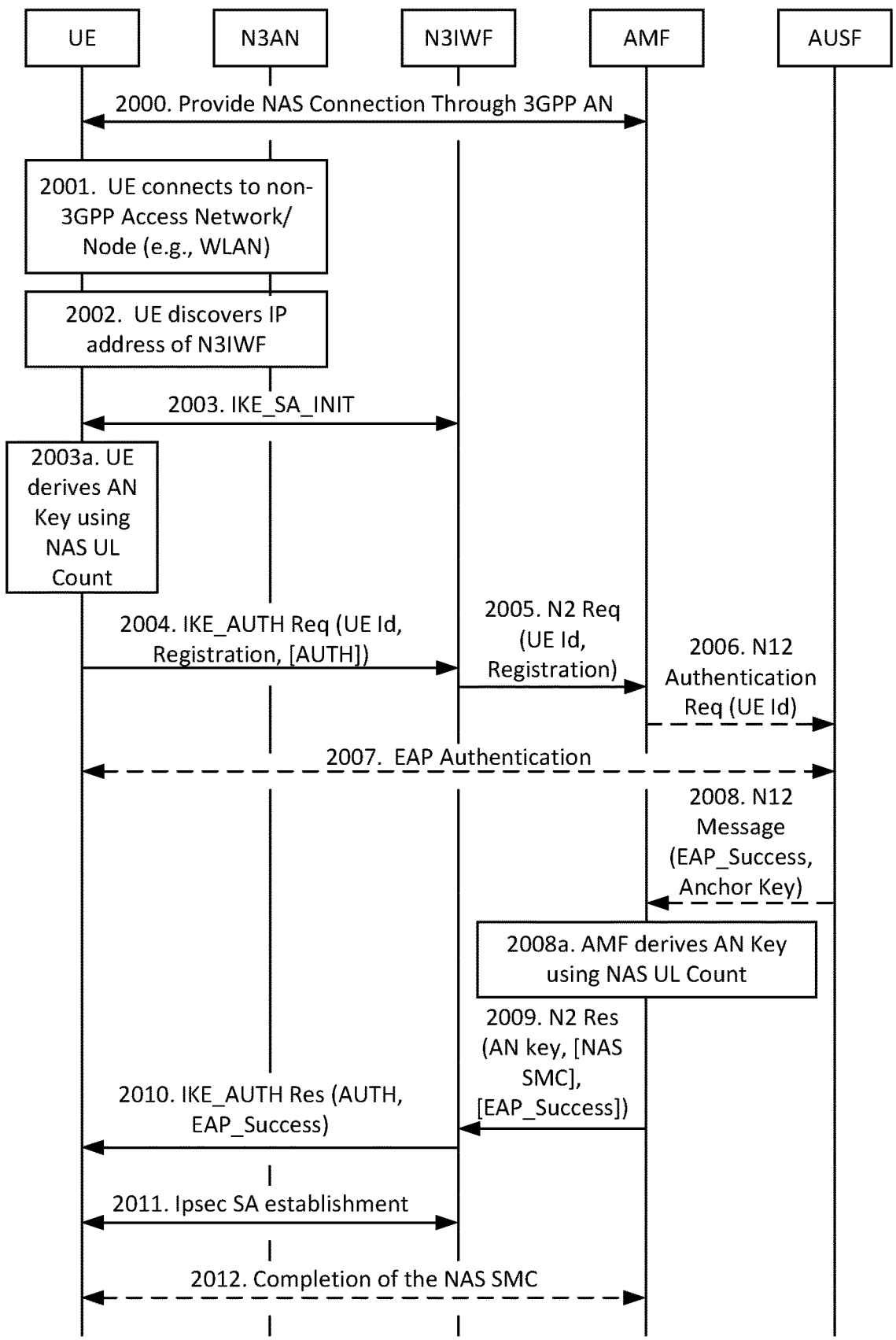
FIGS. 20, 21, and 22 are message diagrams illustrating registration procedures over a non-3GPP access according to some embodiments of inventive concepts.

Access network AN key establishment and distribution will now be discussed with respect to FIG. 20 which shows registration over a non-3GPP access according to some embodiments of inventive concepts. FIG. 20 illustrates a message/operation flow of a security solution for a registration procedure over non-3GPP access using some operations discussed in clause 5.1.4.49 of TR 33.899 (also referred to as reference [6]). A description of messages/operations of FIG. 20 is provided below and the establishment of the access network keys based on the NAS UL COUNT on both sides (UE and network) is provided in operations 2003a and 2008a. Some operations of FIG. 20 may be similar to operations of 4G systems, which may be expected to be reused for 3GPP access in 5G, but orders of execution may be different. In 4G systems and in particular during the initial registration procedures (called attach in 4G), the AN key (KeNB in 4G) may be delivered after the NAS security establishment. A difference in 5G and especially for non-3GPP access may be that such a key may be used/needed before the NAS security establishment (operation 2012) to finalize the IPsec SA establishment (operation 2011). Operations of FIG. 20 are discussed below.

Operation 2000. Before initiating a NAS connection through an untrusted non-3GPP access network N3AN, a NAS connection may be provided between wireless terminal UE and network node AMF through a 3GPP Access Network AN. According to some other embodiments, a NAS connection may be initiated through a non-3GPP access network N3AN without a NAS connection through a 3GPP Access Network AN.

Operation 2001. Wireless terminal UE may discover and associate with an untrusted non-3GPP access network N3AN (e.g., WLAN), and an IP address may be allocated for wireless terminal UE.

Operation 2002. When wireless terminal UE decides to connect to 5G core network node AMF, wireless terminal UE discovers an IP address of N3IWF as specified in TS 23.501 (also referred to as reference [1]).

Operation 2003. Wireless terminal UE proceeds with the establishment of IKE (Internet Key Exchange) SA (Security Association) initiation (IKE_SA_INIT signaling) with the N3IWF by initiating the IKEv2 signaling procedure according to RFC 7296 (also referred to as reference [7]) and RFC 5998 (also referred to as reference [8]).

Operation 2003a. If wireless terminal UE has already established a security context with the AMF over 3GPP access (as discussed above with respect to operation 2000), then the UE may use the most recent value of the NAS UL COUNT on the non-3GPP access to derive the AN key. This key can then be used as the basis for the pre-shared secret in the subsequent IKE_AUTH exchange. If this is an initial registration (i.e., there is no current NAS connection through a 3GPP Access Network AN), then the UE may use a start value (presumably 0) as a NAS UL COUNT to derive the AN key. The NAS UL COUNT may thus be used before synchronization and NAS security establishment for the non-3GPP NAS connection. Therefore, the UE may tentatively use this value and will not assume that the AN key is taken into use until not only the IPsec SA is established but also that the NAS SMC procedure is completed.

Operation 2004. Once the IKE SA (phase 1) is initialized, the UE sends an IKE_AUTH request message to the N3IWF. The UE shall include the UE identifier (e.g., the UE permanent identifier potentially privacy protected or the temporary identifier that was received in a previous registration) in Network Access Identifier NAI format in the IDi payload. The UE shall also include a 3GPP-specific Vendor Id (VID)

payload which contains the registration information or potentially the whole registration NAS message. If the UE has an anchor key from a previous registration (e.g., over a 3GPP access or another non-3GPP access), it may optionally include the AUTH payload computed using a key derived from the anchor key.

Operation 2005. N3IWF constructs the N2 Request message based on the received UE identifier and the VID and forwards it to the selected AMF network node.

Operation 2006. [Conditional] If this is an initial registration (i.e., a NAS connection through a 3GPP Access Network has not yet been provided or is no longer active), the AMF network node requests that the AUSF network node authenticate the UE by sending an authentication request to the AUSF over the N12 interface. Observe that the AMF network node may actually trigger a re-authentication even though it already has a security context with the UE depending on operator security policy, for example.

Operation 2007. [Conditional] If this is an initial registration, EAP-AKA' (EAP Authentication) is run between wireless terminal UE and the AUSF network node.

Operation 2008. [Conditional] If this is an initial registration and the authentication of operation 2007 succeeds, the AUSF network node derives an anchor key and includes it together with the EAP_Success in an N12 message to the AMF network node.

Operation 2008a. If this AMF has already established a security context with the UE over 3GPP access (e.g., based on an existing NAS connection through a 3GPP Access Network), then the AMF network node uses the most recent value of the NAS UL COUNT on the non-3GPP access to derive the AN key (also referred to as the KN3IWF). This key would then be sent to the N3IWF and will form the basis for the pre-shared secret in the subsequent IKE_AUTH exchange. If this is an initial registration (i.e., there is not an existing NAS connection through a 3GPP Access Network), then the AMF network node uses the start value (presumably 0). The NAS UL COUNT is thus used before NAS security establishment. Therefore, the AMF will tentatively use this value and will not assume that the AN key is taken into use until not only the IPsec SA is established but also that the NAS SMC procedure is completed. Further discussion/clarification is provided below.

Operation 2009. The AMF network node sends a N2-Response message containing the KN3IWF (AN key). This message may also include the NAS SMC Request. If the AMF received an EAP-Success payload in the key response message in Operation 2008, the AMF network node includes the EAP-Success payload in the N2 response.

Operation 2010. The N3IWF verifies the last AUTH payload received from wireless terminal UE either in Operation 2003 or in an intermediary operation (not shown), using the key received from the AMF network node (i.e., KN3IWF or AN key). If the AUTH payload is successfully verified, the N3IWF sends an IKE_AUTH response containing an AUTH payload generated using KN3IWF, to wireless terminal UE.

Operation 2011. If wireless terminal UE successfully verifies the AUTH payload provided by the N3IWF, an IPsec SA is established.

Operation 2012. If this is an initial registration procedure or the AMF network node has triggered one already, then a Security Mode Command SMC procedure may be performed.

Failure cases related to early use of NAS UL COUNT values will now be discussed.

In case wireless terminal UE has already established a security context at operation 2001, then the registration request at operation 2004 may at least be integrity protected. NAS security mechanisms in 4G (elements of which may be re-used) implies the inclusion of the NAS SQN in the security header of a protected NAS message. This NAS SQN may be constructed by taking the 8 LSBs from the NAS UL COUNT or NAS DL COUNT depending on the direction. Therefore, whenever there is an established security context between wireless terminal UE and the AMF network node, the derivation of the AN key could (in step 2008a) be based on taking the most recent NAS UL COUNT which has been updated following the reception of a protected registration message. This may work seamlessly over both types of access network.

A difference may occur when there is no security context established, potentially because this is an initial registration or following a timeout after a long period of inactivity. In such cases, the initial registration may not be protected, and therefore, there may not be any NAS SQN value in the registration message based on the 4G mechanism. Whenever this occurs over non-3GPP access, then the AN key may need to be provided to finalize the IKE SA set up (operations 2010 and 2011 in FIG. 20) before the NAS SMC procedure is run (operation 2012). By deriving a key at operation 2008a, the AMF network node may anticipate use of a certain NAS UL COUNT value without constructing that based on NAS SQN value received earlier in a protected NAS message (there is none). Therefore, the AMF network node cannot assume that this a valid value and that it is synchronized with wireless terminal UE until the SMC is run and successfully completed. Further resolution may useful to handle failure cases (e.g., when the AN key is derived and provided to the N3IWF but then the SMC procedure fails).

To address such potential issues, whenever the AMF network node is anticipating a NAS UL COUNT value, then the AMF network node may keep track of the used value and could potentially start a timer in combination with operation 2008a. If the timer times out and the SMC has not been completed, then the anticipated value may be discarded and the procedure may be restarted. In case the SMC procedure is completed and the received NAS SQN value in the protected SMC uplink completion message (from wireless terminal UE) is consistent with the anticipated NAS UL COUNT value, then the AMF network node may safely conclude that this is the correct value.

The same reasoning may also apply to wireless terminal UE in operation 2003a. Whenever wireless terminal UE anticipates a NAS UL COUNT value because no security context is established, then wireless terminal UE cannot conclude it was the correct one before the successful completion of the SMC procedure and the acceptance of the registration request.

Figure 21:
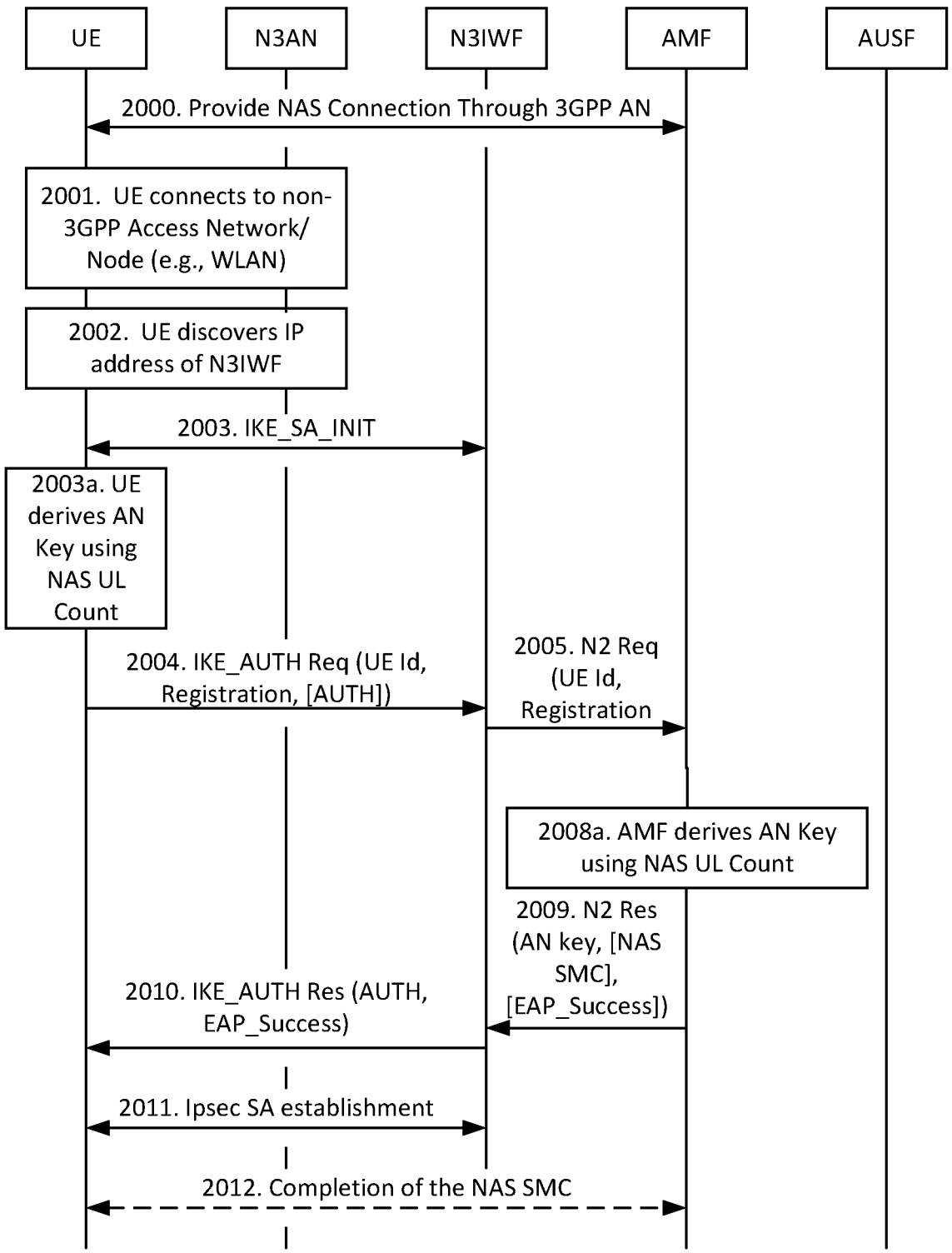

FIG. 21 is a message flow diagram illustrating access network AN key establishment and distribution when a NAS connection is provided through a 3GPP access network AN according to some embodiments of inventive concepts.

Operation 2000. Before initiating a NAS connection through an untrusted non-3GPP access network N3AN in FIG. 21, a NAS connection is provided between wireless terminal UE and network node AMF through a 3GPP Access Network AN using a security context including an anchor key. The NAS connection through the 3GPP Access Network may thus be provided before initiating an internet key exchange IKE security association SA.

Operation 2001. Wireless terminal UE may connect (e.g., discover and associate) with an untrusted non-3GPP access network N3AN (e.g., WLAN), and an IP address may be allocated for wireless terminal UE.

Operation 2002. When wireless terminal UE decides to connect to 5G core network node AMF, wireless terminal UE discovers an IP address of N3IWF as specified in TS 23.501 (also referred to as reference [1]) using the connection to the non-3GPP access network N3AN.

Operation 2003. Wireless terminal UE may initiate an internet key exchange IKE security association SA to establish a Non-Access Stratum (NAS) connection between the wireless terminal UE and the network node AMF through a non-3GPP access network and a non-3GPP interworking function N3IWF network node using the IP address of the N3IWF network node. For example, wireless terminal UE may proceed with the establishment of IKE (Internet Key Exchange) SA (Security Association) initiation (IKE_SA_INIT signaling) with the N3IWF by initiating the IKEv2 signaling procedure according to RFC 7296 (also referred to as reference [7]) and RFC 5998 (also referred to as reference [8]).

Operation 2003a. Wireless terminal UE may derive an access network AN key for the NAS connection through the non-3GPP access network based on a NAS count for the wireless terminal UE and an anchor key (KAMF). Because wireless terminal UE has already established a security context with the AMF over 3GPP access in FIG. 21 (as discussed above with respect to operation 2000), the UE may use the most recent value of the NAS UL COUNT on the non-3GPP access to derive the access network AN key. This key can then be used as the basis for the pre-shared secret in the subsequent IKE_AUTH exchange. The NAS UL COUNT may thus be used before synchronization and NAS security establishment for the non-3GPP NAS connection. Therefore, the UE may tentatively use this value and will not assume that the AN key is taken into use until not only the IPsec SA is established but also that the NAS SMC procedure is completed. The access network AN key may be derived based on the NAS count and a NAS Connection IDentification NAS CID. The NAS CID may be a NAS CID value that is dedicated for non-3GPP NAS connections, and/or the access network key may be derived based on a concatenation of the NAS count and the NAS CID. According to some other embodiments, the access network key may be derived based on the NAS count and based on a process distinguisher (FC) value dedicated for non-3GPP NAS connections.

Operation 2004. Once the IKE SA (phase 1) is initiates (operation 2003) and the access network key has been derived (operation 2003a), the UE transmits an IKE_AUTH request message through the non-3GPP access network to the N3IWF network node, with the IKE authorization request including an identifier of wireless terminal UE. The UE may include the UE identifier (e.g., the UE permanent identifier potentially privacy protected or the temporary identifier that was received in a previous registration) in Network Access Identifier NAI format in the IDi payload. The UE may also include a 3GPP-specific Vendor Id (VID) payload which contains the registration information or potentially the whole registration NAS message. If the UE has an anchor key from a previous registration (e.g., over a 3GPP access or another non-3GPP access), it may optionally include the AUTH payload computed using a key derived from the anchor key. Transmitting the IKE authorization request message, for example, may include performing at least one of integrity protection and/or confidentiality protection for the IKE authorization request using the access network AN key of operation 2003a.

Operation 2005. N3IWF network node constructs the N2 Request message based on the received UE identifier and the VID and forwards it to the selected AMF network node. The N2 Request message may include the identifier of the UE.

Operation 2008a. Responsive to receiving the registration request of operation 2005, AMF network node may derive an access network AN key for a NAS connection between the AMF network node and wireless terminal UE through the N3IWF network node and the non-3GPP access network, with the access network key being derived based on a NAS count associated with the wireless terminal. In FIG. 21, the AMF network node has already established a security context with the UE over 3GPP access (e.g., based on the existing NAS connection through a 3GPP Access Network at operation 2000), and the AMF network node may thus use the most recent value of the NAS UL COUNT on the non-3GPP access to derive the AN key (also referred to as the KN3IWF). This key can then be sent to the N3IWF network node and will form the basis for the pre-shared secret in the subsequent IKE_AUTH exchange. The NAS UL COUNT is thus used before NAS security establishment. Therefore, the AMF will tentatively use this value and will not assume that the AN key is taken into use until not only the IPsec SA is established but also that the NAS SMC procedure is completed. Further discussion/clarification is provided below. The access network AN key may be derived based on the NAS count and a NAS Connection IDentification NAS CID. The NAS CID may be a NAS CID value that is dedicated for non-3GPP NAS connections, and/or the access network key may be derived based on a concatenation of the NAS count and the NAS CID. According to some other embodiments, the access network key may be derived based on the NAS count and based on a process distinguisher (FC) value dedicated for non-3GPP NAS connections.

Operation 2009. The AMF network node transmits an N2-Response message to the N3IWF network node, with the N2-Response message including the KN3IWF (AN key) for the NAS connection through the N3IWF network node and the non-3GPP access network. This message may also include the NAS SMC Request.

Operation 2010. The N3IWF network node may verify the last AUTH payload received from wireless terminal UE either in Operation 2003 or in an intermediary operation (not shown), using the key received from the AMF network node (i.e., KN3IWF or AN key). If the AUTH payload is successfully verified, the N3IWF sends an IKE_AUTH response containing an AUTH payload generated using KN3IWF, to wireless terminal UE. Wireless terminal UE may thus receive the IKE_AUTH response corresponding to the IKE authorization request of operation 2004, and wireless terminal UE may perform at least one of integrity protection and/or confidentiality protection for the IKE authorization response using the access network key.

Operation 2011. If wireless terminal UE successfully verifies the AUTH payload provided by the N3IWF, an IPsec SA is established. Responsive to verifying a payload of the IKE authorization response, wireless terminal UE may thus establish an IPsec security association for an IPsec tunnel between the wireless terminal UE and the N3IWF network node.

Operation 2012. A Security Mode Command SMC procedure may then be performed for the NAS connection through the non-3GPP access network and the N3IWF network node.

Figure 22:
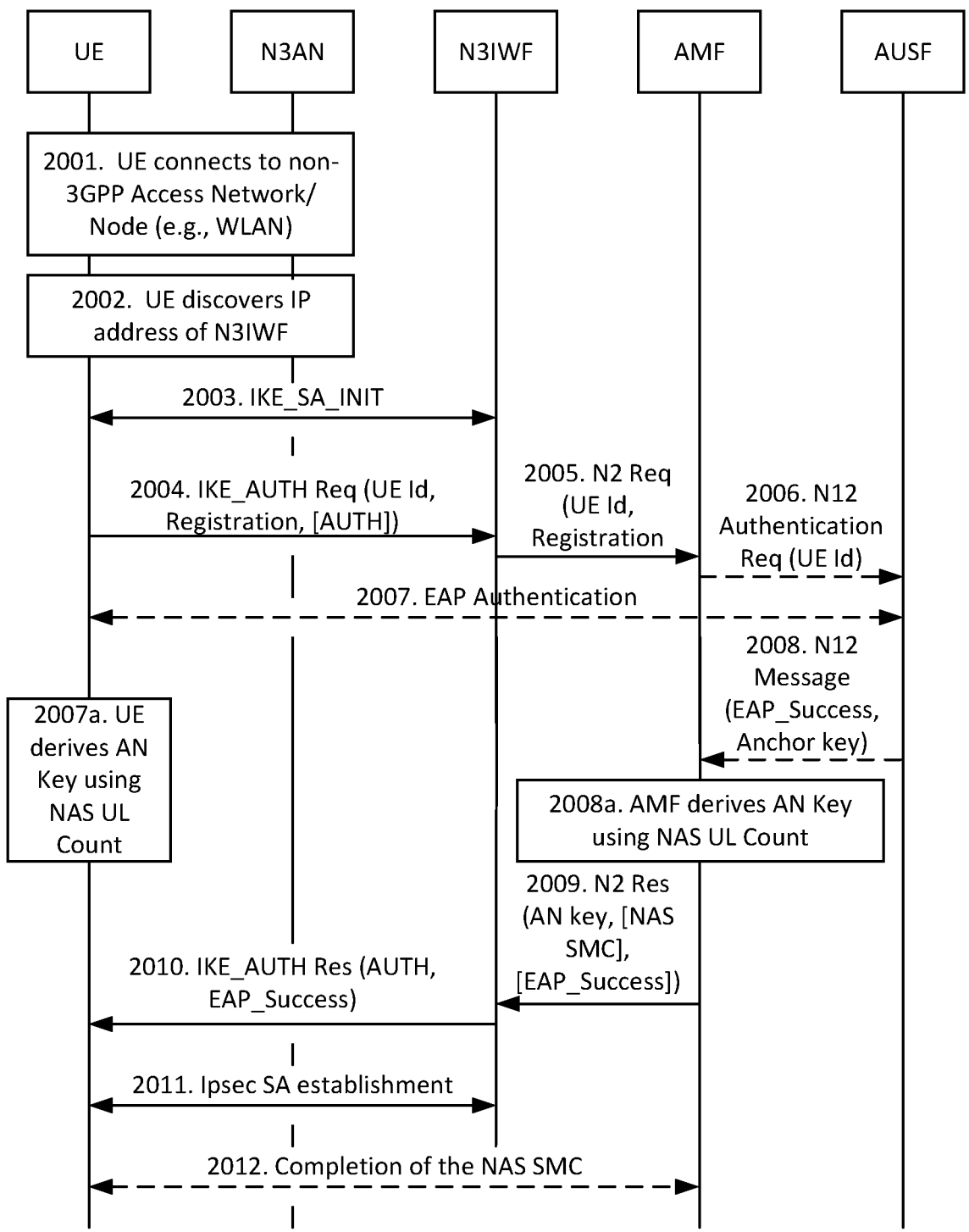

FIG. 22 is a message flow diagram illustrating access network AN key establishment and distribution when a NAS connection is not provided/available through a 3GPP access network AN according to some embodiments of inventive concepts.

Operation 2001. Wireless terminal UE may connect (e.g., discover and associate) with an untrusted non-3GPP access network N3AN (e.g., WLAN), and an IP address may be allocated for wireless terminal UE.

Operation 2002. When wireless terminal UE decides to connect to 5G core network node AMF, wireless terminal UE may discover an IP address of N3IWF network node as specified in TS 23.501 (also referred to as reference [1]) using the connection to the non-3GPP access network.

Operation 2003. Wireless terminal UE may initiate an internet key exchange IKE security association SA to establish a Non-Access Stratum (NAS) connection between the wireless terminal UE and the network node AMF through the non-3GPP access network and a N3IWF network node using the IP address of the N3IWF network node. For example, wireless terminal UE may proceed with the establishment of IKE (Internet Key Exchange) SA (Security Association) initiation (IKE_SA_INIT signaling) with the N3IWF network node by initiating the IKEv2 signaling procedure according to RFC 7296 (also referred to as reference [7]) and RFC 5998 (also referred to as reference [8]).

Operation 2004. Once the IKE SA (phase 1) is initiated, the UE transmits an IKE_AUTH request through the non-3GPP access network to the N3IWF network node, with the IKE authorization request including an identifier of wireless terminal UE. The UE may include the UE identifier (e.g., the UE permanent identifier potentially privacy protected or the temporary identifier that was received in a previous registration) in Network Access Identifier NAI format in the IDi payload. The UE may also include a 3GPP-specific Vendor Id (VID) payload which includes the registration information or potentially the whole registration NAS message.

Operation 2005. N3IWF constructs the N2 Request message based on the received UE identifier and the VID and forwards it to the selected AMF network node. The N2 Request message may include the identifier of the UE.

Operation 2006. In FIG. 22, the registration for the non-3GPP is an initial registration (i.e., a NAS connection through a 3GPP Access Network has not yet been provided or is no longer active), and the AMF network node may thus request that the AUSF network node authenticate the UE by transmitting an authentication request to the AUSF network node over the N12 interface, with the request message including the identifier of the wireless terminal UE. Observe that the AMF network node may actually trigger a re-authentication even though it already has a security context with the UE depending on operator security policy, for example.

Operation 2007. Because operations of FIG. 22 are for an initial registration, EAP-AKA' (EAP Authentication) may be performed between wireless terminal UE and the AUSF network node including derivation of the anchor key (KAMF).

Operation 2007a. In FIG. 22, wireless terminal UE does not have a previously established security context with the AMF over 3GPP access so that the registration is an initial registration (i.e., there is no current NAS connection through a 3GPP Access Network AN). Accordingly, wireless terminal UE may derive an access network key for the NAS connection through the non-3GPP access network after performing EAP authentication, with the access network key being derived based on a NAS count for the wireless terminal UE and an anchor key (KAMF). The UE may use a start value (presumably 0) as a NAS UL COUNT to derive the AN key. The NAS UL COUNT may thus be used before synchronization and NAS security establishment for the non-3GPP NAS connection. Therefore, the UE may tentatively use this value and will not assume that the AN key is taken into use until not only the IPsec SA is established but also that the NAS SMC procedure is completed. The access network AN key may be derived based on the NAS count and a NAS Connection IDentification NAS CID. The NAS CID may be a NAS CID value that is dedicated for non-3GPP NAS connections, and/or the access network key may be derived based on a concatenation of the NAS count and the NAS CID. According to some other embodiments, the access network key may be derived based on the NAS count and based on a process distinguisher (FC) value dedicated for non-3GPP NAS connections.

Operation 2008. Because operations of FIG. 22 are for an initial registration and if the authentication of operation 2007 succeeds, the AUSF network node derives an anchor key and includes it together with the EAP_Success in an N12 message that is transmitted in a response message to the AMF network node. AMF network node receives the response message including the anchor key from the AUSF network node.

Operation 2008a. In FIG. 22, AMF network node does not have an established a security context with the UE over a 3GPP access (e.g., based on an existing NAS connection through a 3GPP Access Network) so that the registration is an initial registration (i.e., there is not an existing NAS connection through a 3GPP Access Network). Accordingly, the AMF network node uses the start value (presumably 0) as the NAS UL COUNT value. The NAS UL COUNT is thus used before NAS security establishment. Therefore, the AMF network node will tentatively use this value and will not assume that the AN key is taken into use until not only the IPsec SA is established but also that the NAS SMC procedure is completed. Further discussion/clarification is provided below. The access network AN key may be derived based on the NAS count and a NAS Connection IDentification NAS CID. The NAS CID may be a NAS CID value that is dedicated for non-3GPP NAS connections, and/or the access network key may be derived based on a concatenation of the NAS count and the NAS CID. According to some other embodiments, the access network key may be derived based on the NAS count and based on a process distinguisher (FC) value dedicated for non-3GPP NAS connections.

Operation 2009. The AMF network node transmits an N2-Response message (also referred to as a registration response) including the KN3IWF key (AN key) for the NAS connection through the N2IWF network node and the non-3GPP access network. This message may also include the NAS SMC Request. If the AMF network node received an EAP-Success payload in the key response message in Operation 2008, the AMF network node may include the EAP-Success payload in the N2 response.

Operation 2010. The N3IWF network node may verify the last AUTH payload received from wireless terminal UE either in Operation 2003 or in an intermediary operation (not shown), using the key received from the AMF network node (i.e., KN3IWF or AN key). If the AUTH payload is successfully verified, the N3IWF sends an IKE_AUTH response containing an AUTH payload generated using KN3IWF, to wireless terminal UE. Wireless terminal UE may thus receive the IKE_AUTH response corresponding to the IKE authorization request of operation 2004, and wireless terminal UE may perform at least one of integrity protection and/or confidentiality protection for the IKE authorization response using the access network key.

Operation 2011. If wireless terminal UE successfully verifies the AUTH payload provided by the N3IWF network node, an IPsec SA is established. Responsive to verifying a payload of the IKE authorization response, wireless terminal UE may thus establish an IPsec security association for an IPsec tunnel between the wireless terminal UE and the N3IWF network node.

Operation 2012. A Security Mode Command SMC procedure may then be performed for the NAS connection through the non-3GPP access network and the N3IWF network node.

Figure 23A:
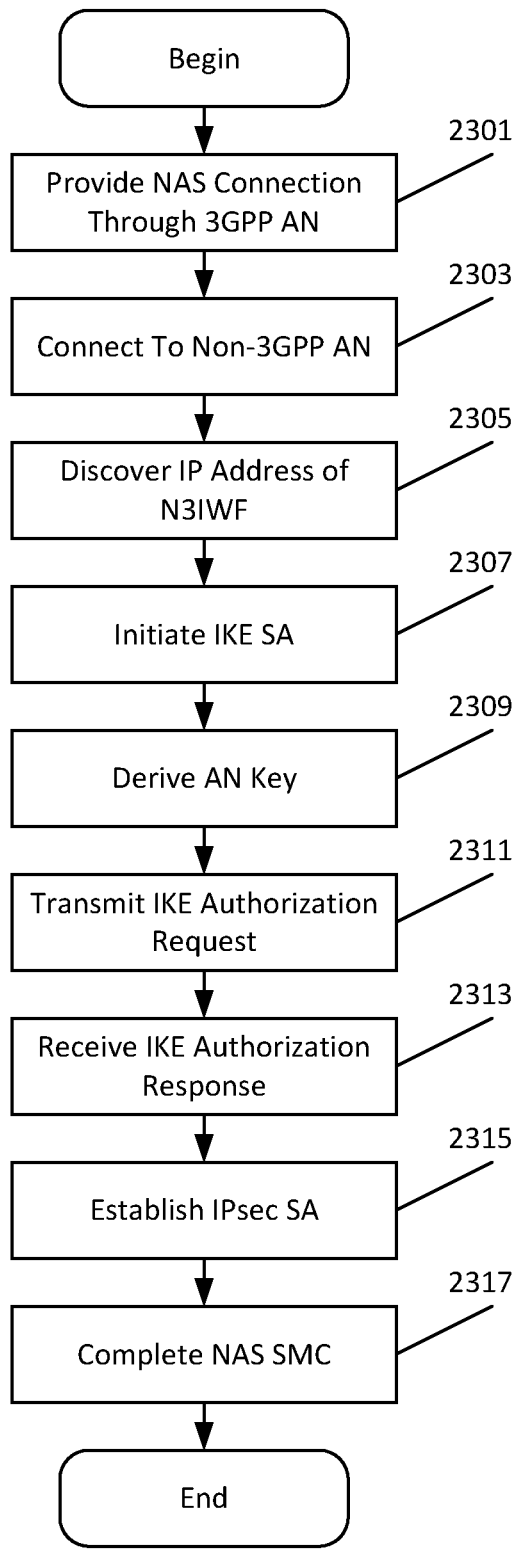

FIG. 23A is a flow chart illustrating wireless terminal UE operations corresponding to FIG. 21 where a NAS connection through a 3GPP Access Network AN has been provided and/or is available. Operations of wireless terminal UE will now be discussed with reference to the flow chart of FIG. 23A and the modules of FIG. 23B. For example, modules of FIG. 23B may be stored in wireless terminal memory 605 of FIG. 6, and these modules may provide instructions so that when the instructions of a module are executed by wireless terminal processor 603, the processor performs respective operations of the flow chart of FIG. 23A.

At block 2301, processor 603 may provide a NAS connection through transceiver 601 between the wireless terminal UE and AMF network node through a 3GPP access node using a security context including the anchor key as discussed above with respect to operation 2000 of FIG. 21 (e.g., using 3GPP NAS module 2351). At block 2303, processor 603 may connect to the non-3GPP access network through transceiver 601 as discussed above with respect to operation 2001 of FIG. 21 (e.g., using non-3GPP connect module 2353). At block 2305, processor 603 may discover an IP address of the N3IWF network node using the connection to the non-3GPP access network as discussed above with respect to operation 2002 of FIG. 21.

At block 2307, processor 603 may initiating (2003) an internet key exchange IKE security association SA to establish a Non-Access Stratum (NAS) connection though transceiver 601 between wireless terminal UE and the AMF network node through a non-3GPP access network and a non-3GPP interworking function N3IWF network node. Processor 603 may initiate the IKE SA as discussed above with respect to operation 2003 of FIG. 21 (e.g., using IKE SA Module 2357). The IKE SA may be initiated after operations of blocks 2301, 2303, and 2305, and the IKE SA may be initiated using the IP address of the N3IWF network node discovered at block 2305.

At block 2309, processor 603 may derive an access network AN key for the NAS connection through the non-3GPP access network at wireless terminal UE. The access network key may be derived based on a NAS count for the wireless terminal UE (e.g., a NAS UL count or a NAS DL count) and an anchor key (KAMF). The AN key may be derived as discussed above with respect to operation 2003*a* of FIG. 21 (e.g., using AN key derivation module 2359).

After deriving the AN key, processor 603 may transmit an IKE authorization request through transceiver 601 and the non-3GPP access network to the N3IWF network node at block 2311, and the IKE authorization request may include an identifier of the wireless terminal UE. Processor 603 may transmit the IKE authorization request as discussed above with respect to operation 2004 of FIG. 21 (e.g., using IKE Auth transmit module 2361). Moreover, transmitting the IKE authorization request may include performing at least one of integrity protection and/or confidentiality protection for the IKE authorization request using the access network key.

At block 2313, processor 603 may receive an IKE authorization response corresponding to the IKE authorization request through transceiver 601. Processor 601 may receive the IKE authorization response as discussed above with respect to operation 2010 of FIG. 21 (e.g., using IKE Auth Receive module 2363). Receiving the IKE authorization response may include performing at least one of integrity protection and/or confidentiality protection for the IKE authorization response using the access network key.

At block 2315, processor 603 may establish an IPsec security association for an IPsec tunnel between wireless terminal UE and the N3IWF network node as discussed above with respect to operation 2011 of FIG. 21 (e.g., using IPsec SA module 2365). Moreover, the IPsec security association may be established responsive to verifying a payload of the IKE authorization response. At block 2317, processor 603 may perform a security mode command SMC procedure for the NAS connection through the non-3GPP access network and the N3IWF network node as discussed above with respect to operation 2012 of FIG. 21 (e.g., using NAS SMC module 2367).

Figure 23B:
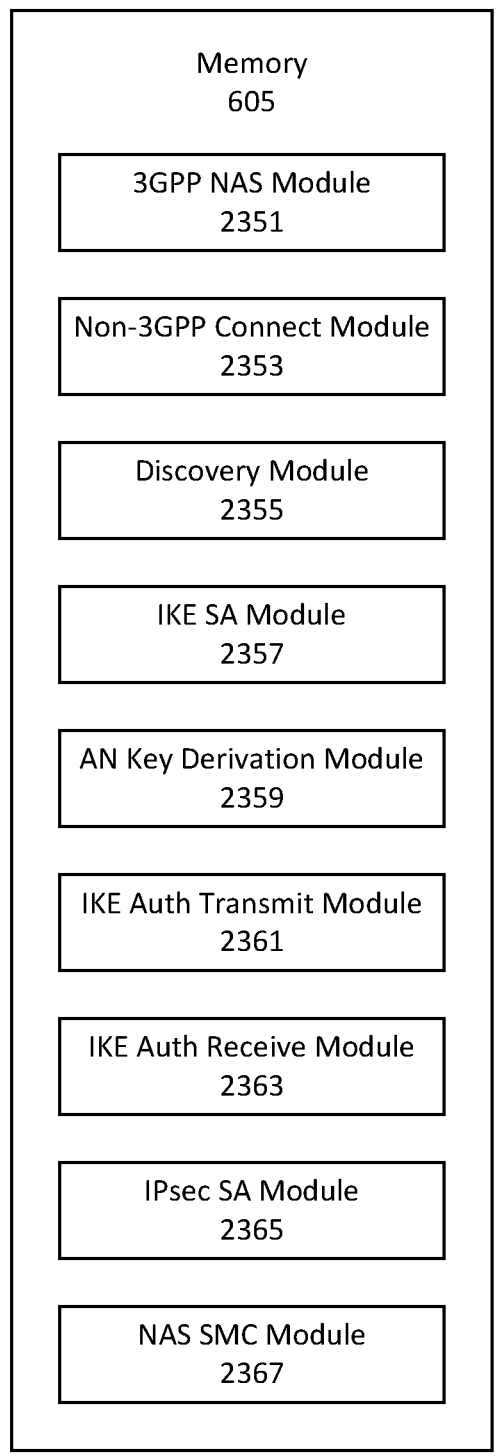

Various operations of FIG. 23A and/or modules of FIG. 23B may be optional with respect to some embodiments. Regarding some embodiments of Claim 1, for example, operations of blocks 2301, 2303, 2305, 2315, and 2317 of FIG. 23A may be optional, and/or modules 2351, 2353, 2355, 2365, and 2367 of FIG. 23B may be optional.

FIG. 24 is a flow chart illustrating wireless terminal UE operations corresponding to FIG. 22 where a NAS connection through a 3GPP Access Network AN is not available. Operations of wireless terminal UE will now be discussed with reference to the flow chart of FIG. 24A and the modules of FIG. 24B. For example, modules of FIG. 24B may be stored in wireless terminal memory 605 of FIG. 6, and these modules may provide instructions so that when the instructions of a module are executed by wireless terminal processor 603, the processor performs respective operations of the flow chart of FIG. 24A.

At block 2401, processor 603 may connect to the non-3GPP access network through transceiver 601 as discussed above with respect to operation 2001 of FIG. 22 (e.g., using non-3GPP connection module 2451). At block 2403, processor 603 may discover an IP address of the N3IWF network node using the connection to the non-3GPP access network as discussed above with respect to operation 2002 of FIG. 22 (e.g., using discovery module 2453).

At block 2405, processor 603 may initiate an internet key exchange IKE security association SA to establish a NAS connection between wireless terminal UE and AMF network node through transceiver 601, the non-3GPP access network, and N3IWF network node. Processor 603 may initiate the IKE SA as discussed above with respect to operation 2003 of FIG. 22 (e.g., using IKE SA module 2455). Moreover, processor 603 may initiate the IKE SA after connecting to the non-3GPP access network and after discovering the IP address of the N3IWF network node, and processor 603 may initiate the IKE SA using the IP address of the N3IWF network node.

After initiating the IKE SA, processor 603 may transmit an IKE authorization request through transceiver 601 and the non-3GPP access network to the N3IWF network node as discussed above with respect to operation 2004 of FIG. 22

(e.g., using IKE Auth transmit module 2457). Moreover, the IKE authorization request may include an identifier of the wireless terminal UE.

After transmitting the IKE authorization request, processor 603 may perform Extensible Authentication Protocol EAP authentication including derivation of the anchor key KAMF as discussed above with respect to operation 2007 of FIG. 22 (e.g., using EAP Auth module 2459). At block 2411, processor 603 may derive an access network key for the NAS connection through the non-3GPP access network at wireless terminal UE as discussed above with respect to operation 2007a of FIG. 22 (e.g., using AN key derivation module 2461). The access network key may be derived based on a NAS count (e.g., a NAS UL count or a NAS DL count) for wireless terminal UE and the anchor key from block 2409.

At block 2413, processor 603 may receive an IKE authorization response corresponding to the IKE authorization request as discussed above with respect to operation 2010 of FIG. 22 as discussed above with respect to operation 2010 of FIG. 22 (e.g., using IKE Auth receive module). Receiving the IKE authorization response may include performing at least one of integrity protection and/or confidentiality protection for the IKE authorization response using the access network key.

Responsive to verifying a payload of the IKE authorization response, processor 603 may establish (2011) an IPsec security association for an IPsec tunnel through transceiver 601 between wireless terminal UE and the N3IWF network node at block 2415 (e.g. using IPsec SA module 2465). The IPsec SA may be established as discussed above with respect to operation 2011 of FIG. 22. After establishing the IPsec security association, processor 603 may perform (2012) a security mode command SMC procedure at block 2417 for the NAS connection through transceiver 603, the non-3GPP access network, and the N3IWF network node (e.g., using NAS SMC module 2467). The SMC procedure may be performed as discussed above with respect to operation 2012 of FIG. 22.

Various operations of FIG. 24A and/or modules of FIG. 24B may be optional with respect to some embodiments. Regarding some embodiments of claim 1, for example, operations of blocks 2401, 2403, 2409, 2415, and 2417 of FIG. 24A may be optional, and/or modules 2451, 2453, 2459, 2465, and 2467 of FIG. 24B may be optional.

Figure 25A:
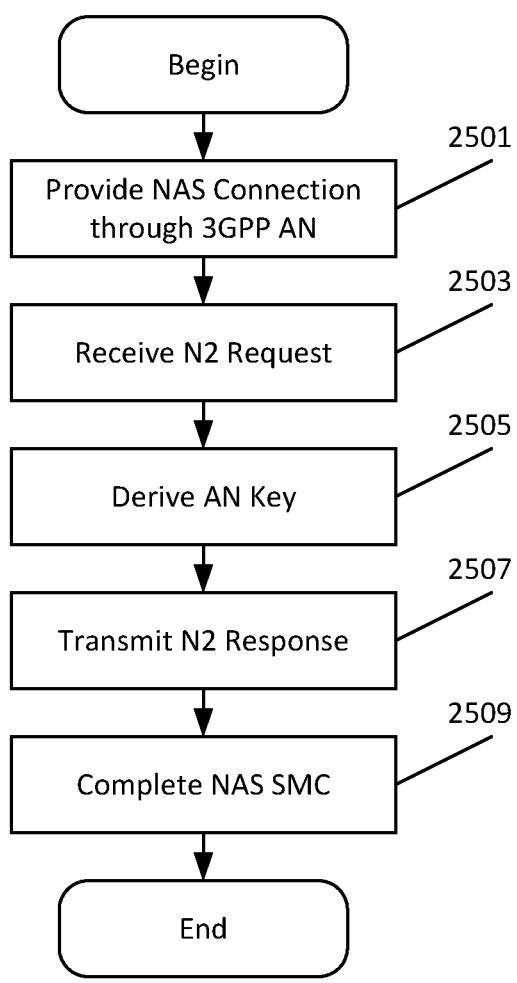
FIGS. 25A and 26A are flow charts illustrating operations of wireless terminals according to some embodiments of inventive concepts.
Figure 25B:
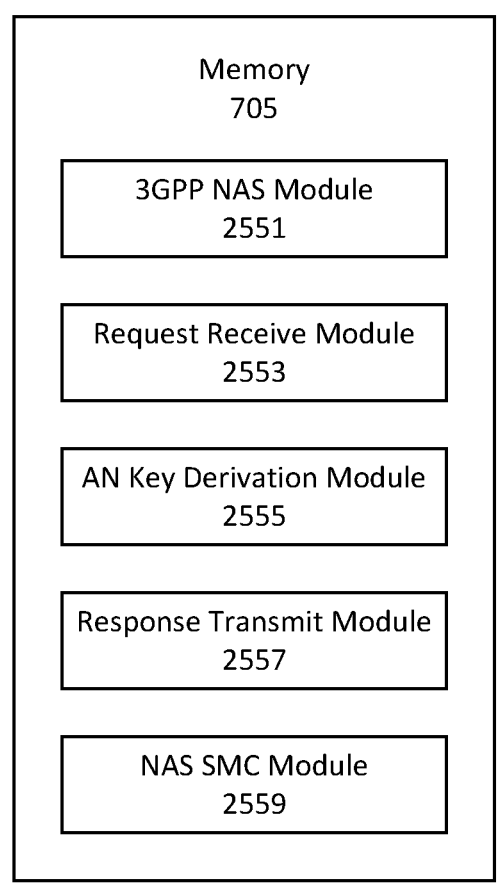
FIGS. 25B and 26B are block diagrams illustrating memory modules corresponding to flow charts of FIGS. 25A and 26A respectively.

FIG. 25 is a flow chart illustrating AMF network node operations corresponding to FIG. 21 where a NAS connection through a 3GPP Access Network AN has been provided and/or is available. Operations of AMF network node will now be discussed with reference to the flow chart of FIG. 25A and the modules of FIG. 25B. For example, modules of FIG. 25B may be stored in AMF network node memory 705 of FIG. 7, and these modules may provide instructions so that when the instructions of a module are executed by AMF network node processor 703, the processor performs respective operations of the flow chart of FIG. 25A.

At block 2501, processor 703 may provide a NAS connection between wireless terminal UE and the AMF network node through network interface 701 and a 3GPP access node using a security context including the anchor key as discussed above with respect to operation 2000 of FIG. 21 (e.g., using 3GPP NAS module 2551). At block 2503, processor 703 may receive an N2 request through network interface 701 as discussed above with respect to operation 2005 of FIG. 21 (e.g., using Request receive module 2553).

At block 2505, processor 703 may derive an access network key for a NAS connection between the AMF network node and wireless terminal UE through network interface 701, N3IWF network node, and a non-3GPP access network as discussed above with respect to operation 2008a of FIG. 21 (e.g., using AN key derivation module 2555). The AN key may be derived responsive to receiving the registration request including an identifier of the wireless terminal UE at block 2503, and the access network key may be derived based on a NAS count (e.g., a NAS UL count or a NAS DL count) associated with wireless terminal UE.

At block 2507, processor 703 may transmit a registration response through network interface 701 to the N3IWF network node as discussed above with respect to operation 2009 of FIG. 21 (e.g., using response transmit module 2557). The registration response may include the access network key for the NAS connection through the N3IWF network node and the non-3GPP access network.

After transmitting the registration response, processor 703 may perform (2012) a security mode command SMC procedure for the NAS connection through network interface 701, the N3IWF network node, and the non-3GPP access network. The SMC procedure may be performed as discussed above with respect to operation 2012 of FIG. 21 (e.g., using NAS SMC module).

Various operations of FIG. 25A and/or modules of FIG. 25B may be optional with respect to some embodiments. Regarding some embodiments of claim 13, for example, operations of blocks 2501 and 2503 of FIG. 25A may be optional, and/or modules 2551 and 2553 of FIG. 25B may be optional.

Figure 26A:
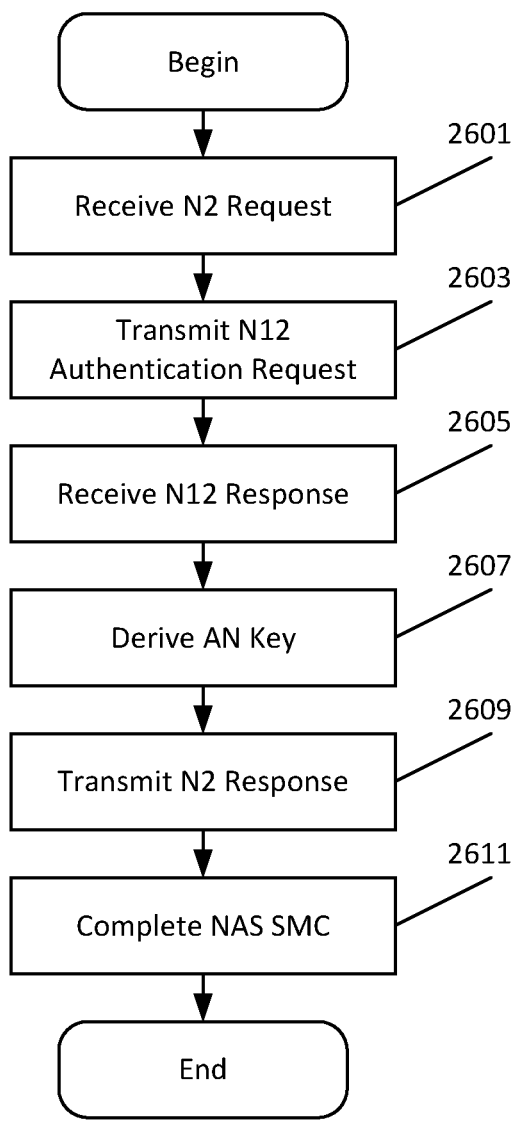
Figure 26B:
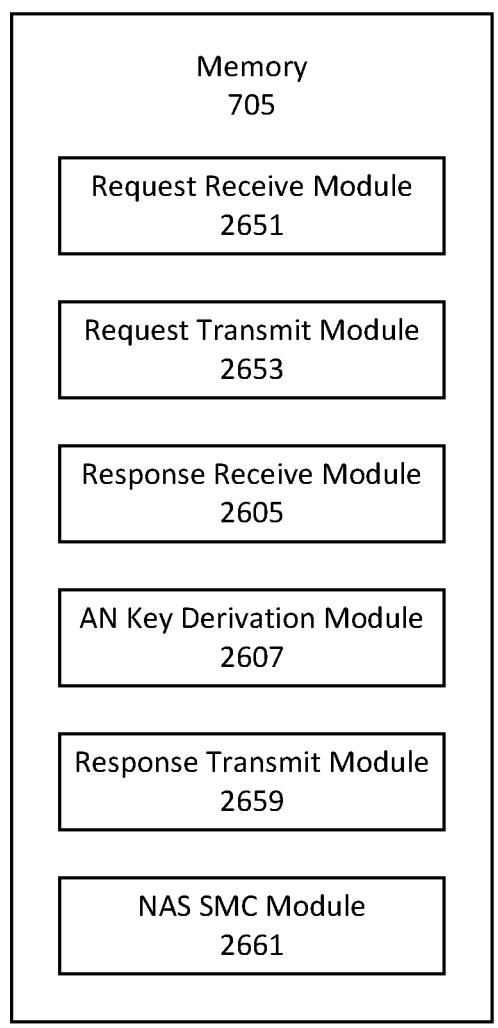

FIG. 26 is a flow chart illustrating AMF network node operations corresponding to FIG. 22 where a NAS connection through a 3GPP Access Network AN is not available. Operations of AMF network node will now be discussed with reference to the flow chart of FIG. 26A and the modules of FIG. 26B. For example, modules of FIG. 26B may be stored in AMF network node memory 705 of FIG. 7, and these modules may provide instructions so that when the instructions of a module are executed by AMF network node processor 703, the processor performs respective operations of the flow chart of FIG. 26A.

At block 2601, processor 703 may receive an N2 request through network interface 701 as discussed above with respect to operation 2005 of FIG. 22 (e.g., using Request receive module 2651). The N2 request may include an identifier of wireless terminal UE.

At block 2603, processor 703 may transmit a request message through network interface 701 to an authentication server function AUSF network node as discussed above with respect to operation 2006 of FIG. 22 (e.g., using request transmit module 2653). The request message may be transmitted responsive to the N2 request of block 2601, and the request message of block 2603 may include the identifier of wireless terminal UE.

At block 2605, processor 703 may receive a response message from the AUSF network node through network interface 701 corresponding to the request message, and the response message may include the anchor key. The response message may be received as discussed above with respect to operation 2008 (e.g., using response receive module 2605).

Responsive to receiving the registration request including the identifier of wireless terminal UE and responsive to receiving the response message, processor 703 may derive an access network key for a NAS connection between AMF network node and wireless terminal UE through network interface 701, N3IWF network node, and non-3GPP access network as discussed above with respect to operation 2008a of FIG. 22 (e.g., using AN key derivation module 2607).

Moreover, the access network key may be derived based on a NAS count (e.g., a NAS UL count or a NAS DL count) associated with the wireless terminal.

At block 2609, processor 703 may transmit a registration response through network interface 701 to the N3IWF network node as discussed above with respect to operation 2009 of FIG. 22 (e.g., using response transmit module 2659). The registration response may include the access network key for the NAS connection through the N3IWF network node and the non-3GPP access network. After transmitting the registration response, processor 703 may perform a security mode command SMC procedure for the NAS connection through the N3IWF network node and the non-3GPP access network at block 2611. The SMC procedure may be performed as discussed above with respect to operation 2012 of FIG. 22 (e.g., using NAS SMC module 2661).

Various operations of FIG. 26A and/or modules of FIG. 26B may be optional with respect to some embodiments. Regarding some embodiments of claim 13, for example, operations of blocks 2601, 2603, and 2605 of FIG. 26A may be optional, and/or modules 2651, 2653, and 2655 of FIG. 26B may be optional.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Abbreviations mentioned in the present disclosure are listed below with explanations thereof.

ABBREVIATION EXPLANATION

AF Application Function
AMF Access Management Function
AN Access Network
AUSF Authentication Server Function
CID NAS Connection Identifier
CM Connection Management
DN Data Network
EAP Extensible Authentication Protocol
EPC Evolved Packet Core
EEA EPS Encryption Algorithm
EIA EPS Integrity Algorithm
eKSI Key Set Identifier in E-UTRAN
ePDG enhanced Packet Data Gateway
EPS Evolved Packet System
E-UTRAN Evolved UMTS Terrestrial Radio Access Network
HPLMN Home PLMN
NAI Network Access Identifier
NAS Non-Access Stratum
N3IWF Non-3GPP Access Inter-Working Function
PCF Packet Control Function
PLMN Public Land Mobile Network
RAN Radio Access Network
RM Registration Management
SN Sequence number
SMC Security Mode Command
SMF Session Management Function
SQN Sequence Number
SUPI Subscriber Unique Permanent Identity
TAU Tracking Area Update
UDM User Data Management
UMTS Universal Mobile Telecommunications System
UPF User Plane Function References mentioned in the present disclosure are listed below.

[1] 3GPP TS 23.501
[2] 3GPP TS 33.401
[3] 3GPP TS 24.301
[4] 3GPP TS 33.220
[5] RFC 2104
[6] TR 33.899
[7] RFC 7296
[8] RFC 5998

The invention claimed is:

1. A method at a user equipment, UE, to support communications with a network node of a wireless communication network, the method comprising:
    initiating an internet key exchange, IKE, security association, SA, to establish a Non-Access Stratum, NAS, connection between the wireless terminal and the network node through a non-3GPP access network and a non-3GPP interworking function, N3IWF, network node;
    after initiating the IKE SA, transmitting an IKE authorization request through the non-3GPP access network to the N3IWF network node, wherein the IKE authorization request includes an identifier of the wireless terminal;
    deriving an access network key for the NAS connection through the non-3GPP access network at the wireless terminal, wherein the access network key is derived based on a NAS count for the wireless terminal, a NAS Connection Identification, NAS CID, for the NAS connection through the non-3GPP access network, a process distinguisher value dedicated for the NAS connection through the non-3GPP access network, and an anchor key, wherein the NAS CID for the NAS connection through the non-3GPP access network comprises a NAS CID value dedicated for non-3GPP NAS connections;
    receiving an IKE authorization response corresponding to the IKE authorization request; and;
    establishing an IPsec security association for an IPsec tunnel between the wireless terminal and the N3IWF network node using the access network key.

2. The method of claim 1, wherein establishing the IPsec security association for the IPsec tunnel comprises establishing the IPsec security association for the IPsec tunnel responsive to verifying a payload of the IKE authorization response.

3. The method of claim 2, further comprising:
    after establishing the IPsec security association, performing a security mode command, SMC, procedure for the NAS connection through the non-3GPP access network and the N3IWF network node.

4. The method of claim 1, further comprising:
    before initiating the IKE SA, providing a NAS connection between the wireless terminal and the network node through a 3GPP access node using a security context including the anchor key.

5. The method of claim 4, wherein deriving the access network key for the NAS connection through the non-3GPP access network precedes transmitting the IKE authorization request, and wherein transmitting the IKE authorization request comprises performing at least one of integrity protection and/or confidentiality protection for the IKE authorization request using the access network key.

6. The method of claim 1, further comprising:
    after transmitting the IKE authorization request, performing Extensible Authentication Protocol, EAP, authentication including derivation of the anchor key;
    wherein deriving the access network key comprises deriving the access network key for the NAS connection through the non-3GPP access network after performing EAP authentication.

7. The method of claim 1, further comprising:
    before initiating the IKE SA, connecting to the non-3GPP access network; and
    before initiating the IKE SA, discovering an Internet Protocol, IP, address of the N3IWF network node using the connection to the non-3GPP access network;

wherein initiating the IKE SA comprises initiating the IKE SA using the IP address of the N3IWF network node.

8. The method of claim 1, wherein the access network key is derived based on a concatenation of the NAS count and the NAS CID.

9. The method of claim 1, wherein the access network key is derived based on the NAS count and based on a process distinguisher value dedicated for non-3GPP NAS connections.

10. A user equipment, UE, that supports communication with a network node of a wireless communication network, the wireless terminal comprising:
- a transceiver configured to provide wireless communication over a radio interface; and
- a processor coupled to the transceiver, wherein the processor is configured to:
  - initiate an internet key exchange, IKE, security association, SA, to establish a-Non-Access Stratum, NAS, connection between the wireless terminal and the network node through a non-3GPP access network and a non-3GPP interworking function, N3IWF, network node;
  - transmit an IKE authorization request through the non-3GPP access network to the N3IWF network node after initiating the IKE SA, wherein the IKE authorization request includes an identifier of the wireless terminal;
  - derive an access network key for the NAS connection through the non-3GPP access network at the wireless terminal, wherein the access network key is derived based on a NAS count for the wireless terminal, a NAS connection identification, NAS CID, for the NAS connection through the non-3GPP access network, a process distinguisher value dedicated for the NAS connection through the non-3GPP network, and an anchor key, wherein the NAS CID for the NAS connection through the non-3GPP access network comprises a NAS CID value dedicated for non-3GPP NAS connections;
  - receive an IKE authorization response corresponding to the IKE authorization request; and
  - establish an IPsec security association for an IPsec tunnel between the wireless terminal and the N3IWF network node using the access network key.

\* \* \* \* \*